United States Patent
Hoshizuki et al.

(10) Patent No.: US 12,368,573 B2
(45) Date of Patent: Jul. 22, 2025

(54) ENCRYPTION PROCESSING DEVICE AND ENCRYPTION PROCESSING METHOD

(71) Applicant: AXELL CORPORATION, Tokyo (JP)

(72) Inventors: Yusuke Hoshizuki, Tokyo (JP); Kotaro Matsuoka, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 194 days.

(21) Appl. No.: 18/352,030

(22) Filed: Jul. 13, 2023

(65) Prior Publication Data
US 2024/0039698 A1 Feb. 1, 2024

(30) Foreign Application Priority Data

Jul. 19, 2022 (JP) .................................. 2022-114761
Jan. 11, 2023 (JP) .................................. 2023-002303

(51) Int. Cl.
*H04L 9/06* (2006.01)
*H04L 9/00* (2022.01)

(52) U.S. Cl.
CPC ............ *H04L 9/0618* (2013.01); *H04L 9/008* (2013.01)

(58) Field of Classification Search
CPC ............................... H04L 9/0618; H04L 9/008
See application file for complete search history.

(56) References Cited

U.S. PATENT DOCUMENTS

| | | | |
|---|---|---|---|
| 2013/0216044 A1* | 8/2013 | Gentry | H04L 9/008 380/277 |
| 2023/0035988 A1* | 2/2023 | Kim | H04L 9/008 |

OTHER PUBLICATIONS

Integer-Wise Functional Bootstrapping on TFHE: Applications in Secure Integer Arithmetics, by Kiyomoto et al.; published 2021. (Year: 2021).*
Linear Depth Integer-Wise Homomorphic Division, by Kiyomoto et al. published 2018. (Year: 2018).*
Chillotti, I. et al., "TFHE: Fast Fully Homomorphic Encryption over the Torus," Journal of Cryptology, 33:34-91, 2020, 62 pages.
Okada, H., Kiyomoto, S., Cid, C. (2020). "Integerwise Functional Bootstrapping on TFHE," in: Susilo, W., et al. (eds) Information Security. ISC 2020. Lecture Notes in Computer Science(), vol. 12472. Springer, Cham. https://doi.org/10.1007/978-3-030-62974-8_7, 19 pages.

* cited by examiner

*Primary Examiner* — Vu V Tran
(74) *Attorney, Agent, or Firm* — MASUVALLEY & PARTNERS; Peter Martinez

(57) ABSTRACT

An encryption processing device that processes a ciphertext, the ciphertext being a fully homomorphic ciphertext that has a value obtained by adding an error with a predetermined variance to a predetermined value, as a plaintext associated with an integer and that enables a predetermined operation between integers to be performed without decryption, the device including a processor which executes a process including generating, based on a first ciphertext as a multiplier, a third ciphertext having a first stepped polynomial as a plaintext and performing an operation based on the third ciphertext and a second ciphertext as a multiplicand to calculate a ciphertext corresponding to a result of multiplication between plaintexts of the first ciphertext and the second ciphertext as a fourth ciphertext of an operation result.

17 Claims, 13 Drawing Sheets

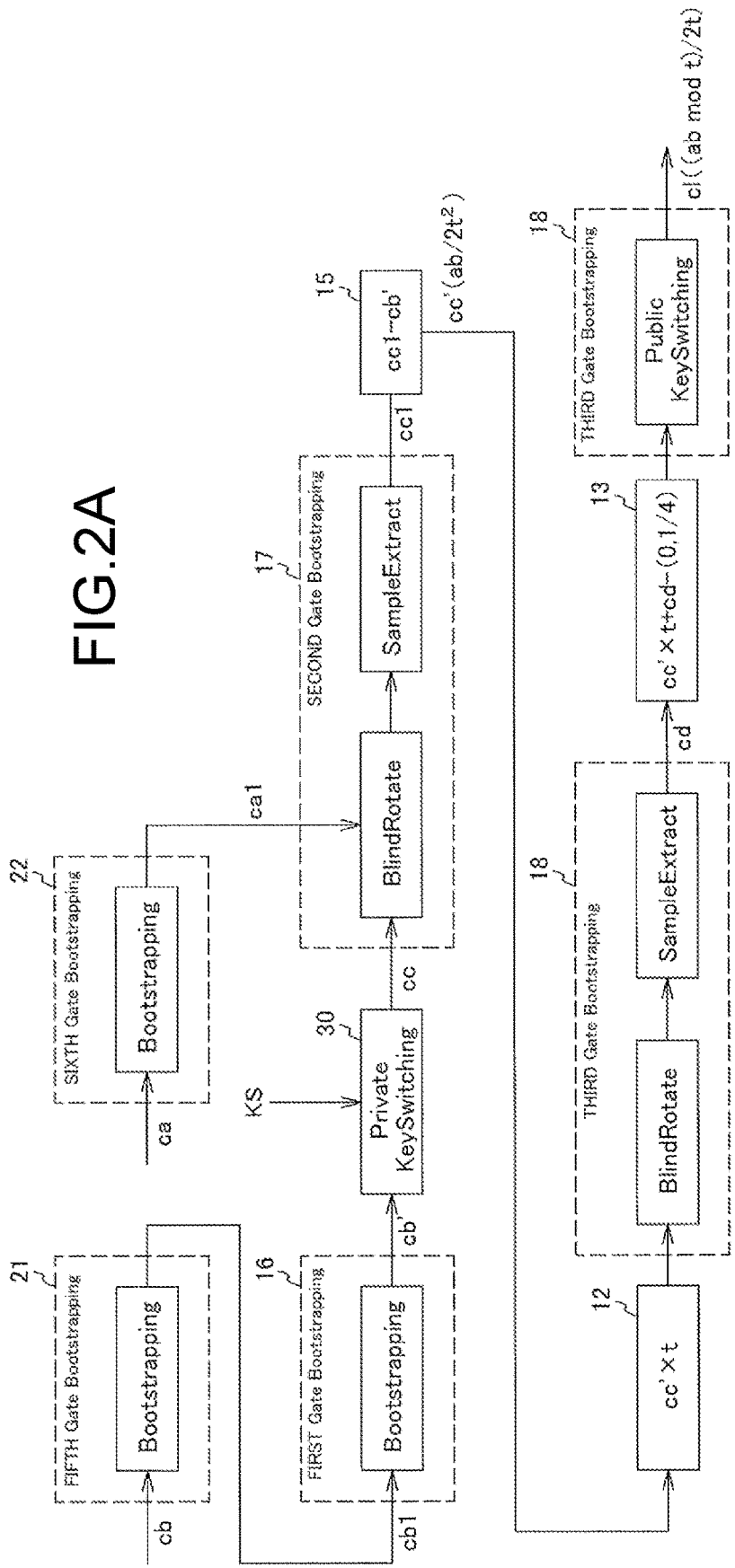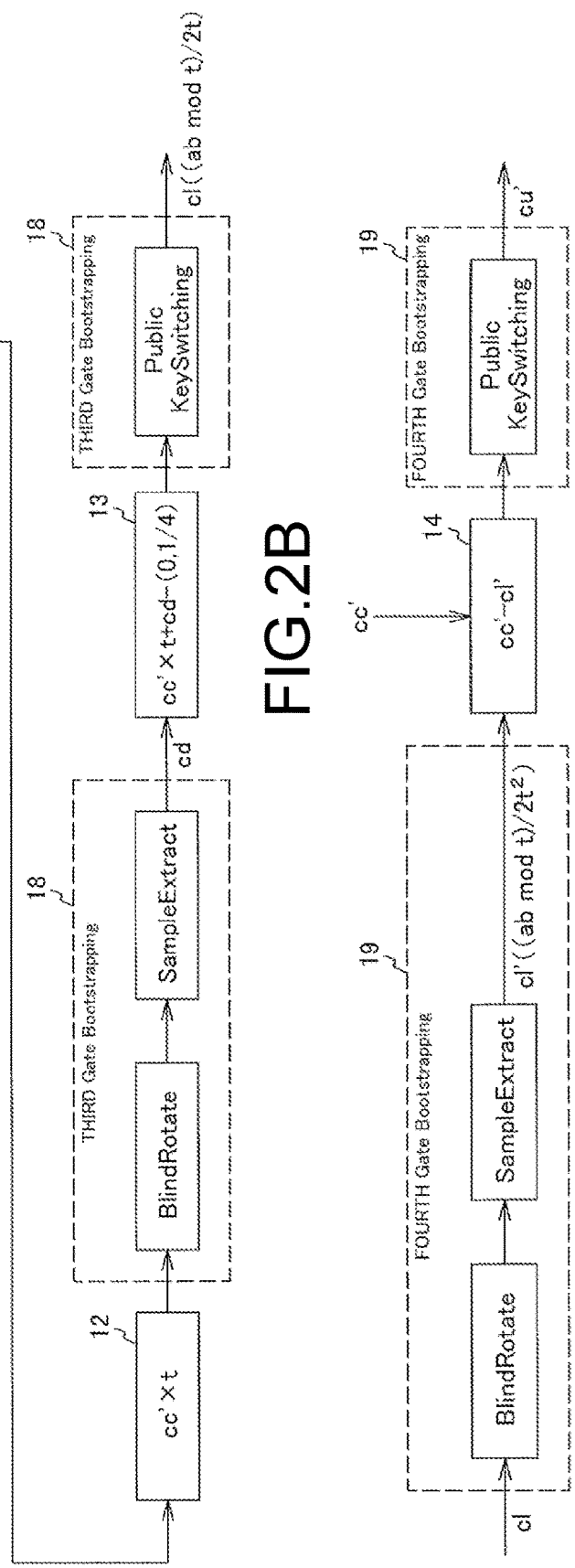

FIG.7
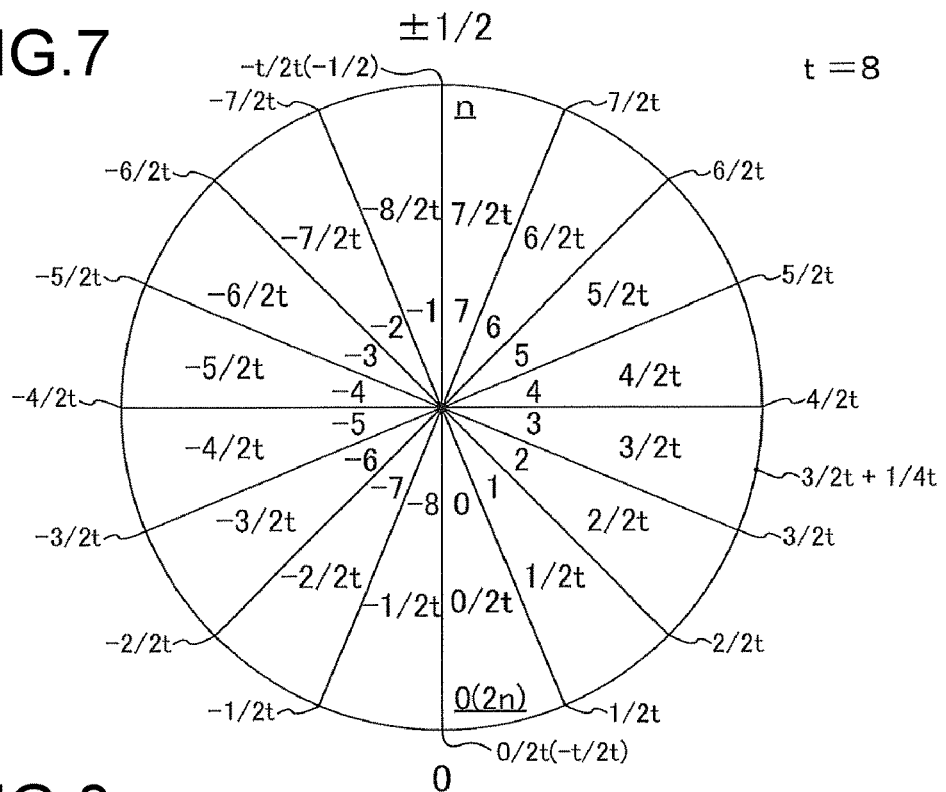
FIG.8
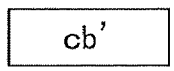
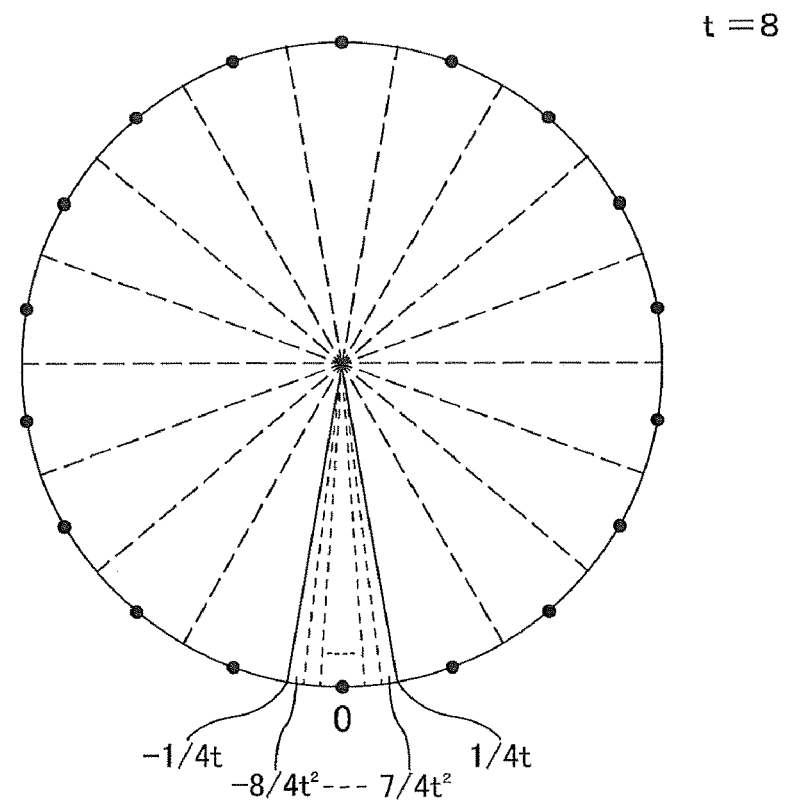

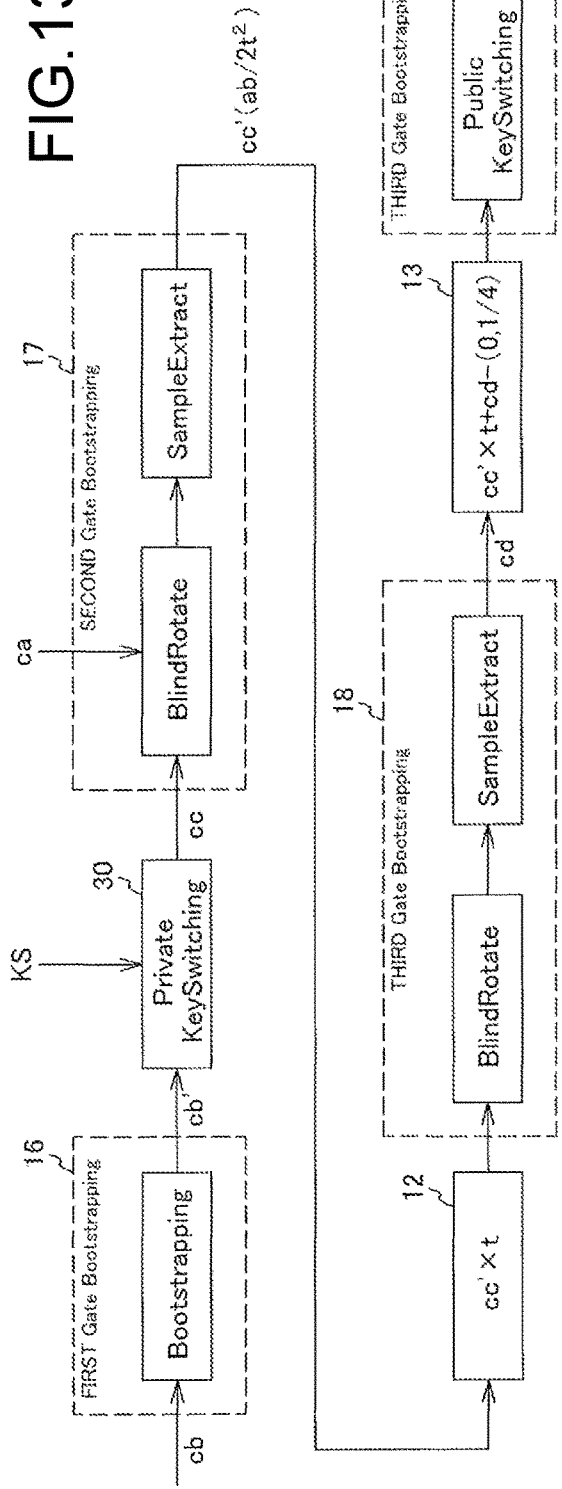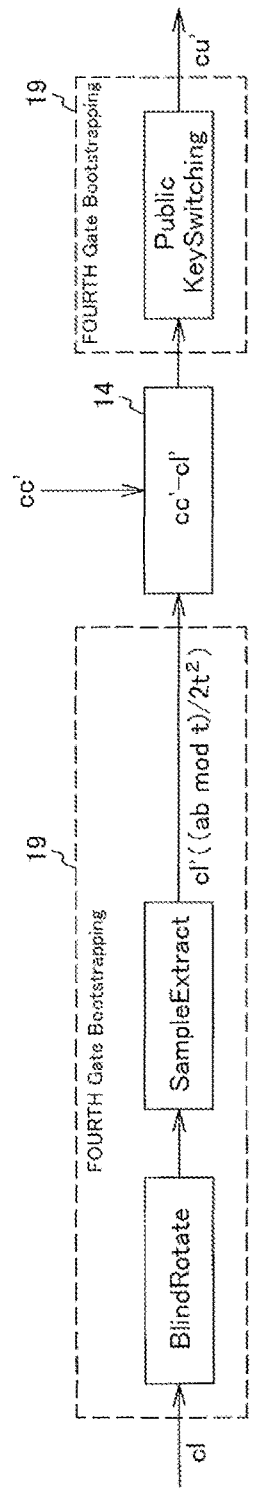

ENCRYPTION PROCESSING DEVICE AND ENCRYPTION PROCESSING METHOD

RELATED APPLICATIONS

This application is based upon and claims the benefit of priorities to the prior Japanese Patent Application No. 2022-114761, filed on Jul. 19, 2022, and the prior Japanese Patent Application No. 2023-002303, filed on Jan. 11, 2023, the entire contents of which are incorporated herein by reference.

FIELD OF THE INVENTION

The embodiments discussed herein are related to an encryption processing device and an encryption processing method.

BACKGROUND OF THE INVENTION

Homomorphic encryption is an encryption technique that can process encrypted data without decrypting the encrypted data.

Encryption that allows an operation between ciphertexts, corresponding to addition of plaintexts, to be performed is additive homomorphic encryption, and encryption that allows an operation between ciphertexts, corresponding to multiplication of plaintexts, to be performed is multiplicative homomorphic encryption.

There are conventionally known additive homomorphic encryption that performs only an additive operation (addition and subtraction) while a finite cyclic group is regarded as an integer and multiplicative homomorphic encryption that performs only a multiplicative operation (multiplication) while a finite cyclic group is regarded as an integer.

For the finite cyclic group, an integral multiple can be obtained by repeating addition, and therefore an integral multiple by a plaintext can be calculated. Also, exponentiation by a plaintext can be calculated by repeating multiplication.

There are also known ring homomorphic encryption that processes both an additive operation and a multiplicative operation while ciphertexts remain encrypted and fully homomorphic encryption (FHE) that allows all arithmetic operations including addition and multiplication.

One of known fully homomorphic encryption techniques is fully homomorphic encryption based on the LWE (Learning with Errors) problem, which is configured by adding a small error to a plaintext in an encryption process to such an extent that there is no problem in decryption.

In the fully homomorphic encryption based on the LWE problem, an error is accumulated as an operation is repeated, and therefore, bootstrapping for reducing an error component while the error component remains encrypted is performed before the error becomes too large to allow decryption.

The computation time of bootstrapping occupies most of the computation time required when an operation is performed by fully homomorphic encryption. Further, the amount of computation is large in bootstrapping, because bootstrapping handles a large amount of data. Therefore, in the operation of fully homomorphic encryption, there is a problem that the operation result cannot be obtained within a practical time.

A scheme that drastically improves this problem is TFHE (Fast Fully Homomorphic Encryption over the Torus) described in TFHE: Fast Fully Homomorphic Encryption over the Torus. Journal of Cryptology, 33:34-91, 2020, I. Chillotti, N. Gama, M. Georgieva, and M. Izabachene (referred to as "aforementioned paper" in the following descriptions).

Homomorphic encryption includes Bit-wise type homomorphic encryption having two values as a plaintext and based on a logical operation, and Integer-wise type homomorphic encryption having a whole integer as a plaintext as one ciphertext. TFHE described in Non-Patent Literature 1 is the Bit-wise type.

The plaintext in TFHE is a real number from 0 to 1 associated with a circle group. Therefore, by associating sections obtained by dividing the range from 0 to 1 of the circle group with integers in turn, TFHE can be applied as Integer-wise type homomorphic encryption having an integer as the plaintext (for example, Integerwise Functional Boostrapping on TFHE, 2020, Hiroki Okada, Shinsaku Kiyomoto, and Carlos Cid).

If TFHE can be used as homomorphic encryption that enables four arithmetic operations to be performed in an Integer-wise manner, more efficient processing can be performed as compared with bit-by-bit computation.

A TLWE ciphertext used in TFHE is shown by the aforementioned paper as being an additive homomorphic type for a plaintext on a circle group, and it is obvious that addition (subtraction) can be performed. Meanwhile, as for multiplication, although multiplication between an integer and a circle group (a ciphertext) is defined because the circle group is a Z-module, a multiplicative operation between circle groups is not obvious because it is not defined.

SUMMARY OF THE INVENTION

According to an aspect of the embodiments, an encryption processing device processes a ciphertext, the ciphertext being a fully homomorphic ciphertext that has a value obtained by adding an error with a predetermined variance to a predetermined value, as a plaintext associated with an integer and that enables a predetermined operation between integers to be performed without decryption. The encryption processing device comprises a processor which executes the following process. That is, generating, based on a first ciphertext as a multiplier, a third ciphertext having a first stepped polynomial as a plaintext, and performing an operation based on the third ciphertext and a second ciphertext as a multiplicand to calculate a ciphertext corresponding to a result of multiplication between plaintexts of the first ciphertext and the second ciphertext as a fourth ciphertext of an operation result.

The objects and advantages of the invention will be realized and achieved by the elements and combinations specifically pointed out in the claims.

It is to be understood that both the foregoing general description and the following detailed description are exemplary and illustrative and are not intended to limit the invention as claimed.

BRIEF DESCRIPTION OF DRAWINGS

FIGS. 2A and 2B are detailed explanatory diagrams of an operation process based on the functional configuration in FIG. 1;

FIG. 7 is an explanatory diagram of Integer-wise type TFHE in the present embodiment;

FIG. 8 is an explanatory diagram of Integer-wise type TFHE in the present embodiment;

FIGS. 13A and 13B are explanatory diagrams of an operation process based on the functional configuration in FIG. 12;

DESCRIPTION OF EMBODIMENTS

Embodiments of the present invention are described below in detail with reference to the drawings.

In the following descriptions, an alphanumeric character sandwiched by [ ] indicates that it is a vector. An alphanumeric character sandwiched by { } indicates that it is a set.

Further, in the present specification, a "logical operation" refers to a binary or multi-value operation.

First Example

Figure 1:
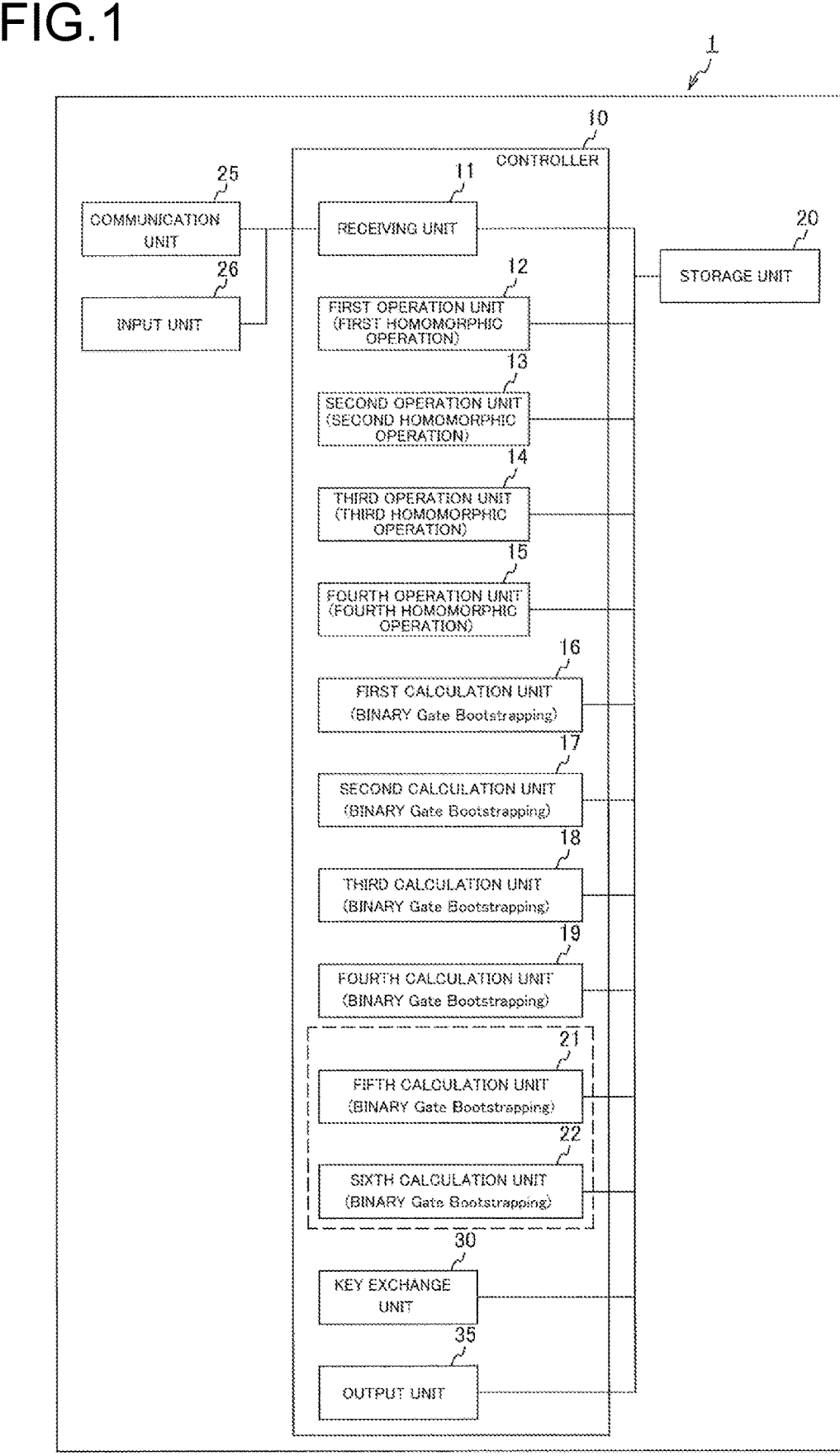
FIG. 1 is an explanatory diagram of a functional configuration of an encryption processing device according to a first example of the present embodiment.

FIG. 1 is an explanatory diagram of a functional configuration of an encryption processing device according to a first example of the present embodiment.

An encryption processing device 1 includes a controller 10, a storage unit 20, a communication unit 25, and an input unit 26.

The controller 10 includes a receiving unit 11, a first operation unit 12, a second operation unit 13, a third operation unit 14, a fourth operation unit 15, a first Bootstrapping unit (a calculation unit) 16, a second Bootstrapping unit (a calculation unit) 17, a third Bootstrapping unit (a calculation unit) 18, a fourth Bootstrapping unit (a calculation unit) 19, a key exchange unit 30, and an output unit 35.

The controller 10 also includes a fifth Bootstrapping unit (a calculation unit) 21 and a sixth Bootstrapping unit (a calculation unit) 22 that serve as a pre-processing unit.

The encryption processing device 1 performs signed multiplication between Integer-wise type TLWE ciphertexts by using the whole (the entire surface) of a circle group forming ciphertexts. The signed multiplication is multiplication using negative integers that have the negative sign.

The encryption processing device 1 can also perform multiplication between ciphertexts of positive integers by using a half plane (the right half plane) of a circle group, as a simpler multiplication technique. This multiplication technique will be described later as a second example. In the second example, the fifth Bootstrapping unit 21 and the sixth Bootstrapping unit 22 as the pre-processing unit and the fourth operation unit 15 are not necessary.

The receiving unit 11 receives input of a ciphertext that is an object of an operation, via the communication unit 25 or the input unit 26. Alternatively, the receiving unit 11 receives input of a ciphertext from another process performed by the encryption processing device 1.

The first operation unit 12 performs a first homomorphic operation for a ciphertext output from the fourth operation unit 15 described later.

The second operation unit 13 performs a second homomorphic operation for a ciphertext output in the middle of processing by the third Bootstrapping unit 18.

The third operation unit 14 performs a third homomorphic operation for a ciphertext output in the middle of processing by the fourth Bootstrapping unit 19.

The fourth operation unit 15 performs a fourth homomorphic operation for a ciphertext output from the second Bootstrapping unit 17.

The first Bootstrapping unit 16 performs first Gate Bootstrapping for a ciphertext pre-processed by the fifth Bootstrapping unit 21.

The second Bootstrapping unit 17 performs second Gate Bootstrapping for a ciphertext output from the key exchange unit 30, which has been subjected to key exchange, and a ciphertext pre-processed by the sixth Bootstrapping unit 21.

The third Bootstrapping unit 18 performs third Gate Bootstrapping for a ciphertext output from the first operation unit 12.

The fourth Bootstrapping unit 19 performs fourth Gate Bootstrapping for a ciphertext output from the third Bootstrapping unit 18.

The fifth Bootstrapping unit 21 performs fifth Gate Bootstrapping as pre-processing for an input ciphertext.

The sixth Bootstrapping unit 22 performs sixth Gate Bootstrapping as pre-processing for an input ciphertext.

The key exchange unit 30 performs Private Key Switching, described later, that exchanges a private key of a ciphertext output from the first Bootstrapping unit 16. Private Key Switching is essentially performed for obtaining a TRLWE ciphertext having a stepped polynomial as the plaintext from a TLWE ciphertext as a multiplier, and exchange of a private key of a ciphertext is not an end in itself. Another method may be used, as long as a TRLWE ciphertext having a stepped polynomial as the plaintext (the plaintext polynomial) is obtained.

The first, second, third, and fourth operation units 12, 13, 14, and 15 are arithmetic processing units each of which implements a homomorphic operation described below, by software.

The first, second, third, and fourth Bootstrapping units 16, 17, 18, and 19 are arithmetic processing units each of which implements a Gate Bootstrapping process described below, by software.

The key exchange unit 30 is an arithmetic processing unit that implements Private Key Switching by software.

At least one of the first, second, third, and fourth operation units 12, 13, 14, and 15, the first, second, third, and fourth Bootstrapping units 16, 17, 18, and 19, the key exchange unit 30, and the output unit 35 may be implemented by hardware.

The output unit 35 outputs a final operation result to outside of the encryption processing device 1 or to another processing process performed in the encryption processing device 1.

The storage unit 20 can store therein an input ciphertext, a temporary file and temporary data used in an operation for ciphertexts, and an output ciphertext.

An encrypted encryption database 60 can also be stored in the storage unit 20.

The communication unit 25 connects the encryption processing device 1 to a network, thereby enabling communication between the encryption processing device 1 and an external device to be performed.

The encryption processing device 1 can serve as a database server by storing the encrypted encryption database 60 in the storage unit 20 and including the communication unit 25.

In this case, the encryption processing device 1 can receive an encrypted query from a terminal device as the external device, search the encrypted encryption database 60, and send an encrypted search result to the terminal device.

The input unit 26 inputs a ciphertext that is an object of arithmetic processing and a query for the encrypted database 60, to the encryption processing device 1.

FIGS. 2A and 2B are more detailed explanatory diagrams of an operation process based on the functional configuration in FIG. 1.

The configuration illustrated in FIGS. 2A and 2B uses Gate Bootstrapping presented in the aforementioned paper. Gate Bootstrapping in TFHE presented in the aforementioned paper will be described in detail below.

As described above, the encryption processing device 1 performs multiplication between Integer-wise type TLWE ciphertexts. Here, a TLWE ciphertext ca is a ciphertext of a plaintext integer a that is a multiplicand, and a TLWE ciphertext cb is a ciphertext of a plaintext integer b as a multiplier.

In FIG. 2A, as pre-processing prior to a multiplication process, the encryption processing device 1 inputs the TLWE ciphertext cb to the fifth Bootstrapping unit 21 and performs the fifth Gate Bootstrapping to obtain a new TLWE ciphertext cb1.

The encryption processing device 1 also inputs the TLWE ciphertext ca to the sixth Bootstrapping unit 22 and performs the sixth Gate Bootstrapping as pre-processing, thereby obtaining a new TLWE ciphertext ca1.

The encryption processing device 1 inputs the new TLWE ciphertext cb1 after the fifth Bootstrapping to the first Bootstrapping unit 16 and performs the first Bootstrapping to obtain a TLWE ciphertext cb'. The first Bootstrapping is a process for converting a circle group in the TLWE ciphertext cb1 from 2t divisions to $2t^2$ divisions for a ciphertext as a multiplication result.

The encryption processing device 1 further inputs the TLWE ciphertext cb' to the key exchange unit 30 and performs Private Key Switching for the TLWE ciphertext cb' with a key switching key KS1, thereby obtaining a TRLWE ciphertext cc having a stepped polynomial as the plaintext (a plaintext polynomial).

The encryption processing device 1 further inputs the TRLWE ciphertext cc to the second Bootstrapping unit 17 and performs the second Bootstrapping (BlindRotate and SampleExtract) using the TRLWE ciphertext cc and the TLWE ciphertext ca1 as inputs, thereby obtaining a TLWE ciphertext cc1.

Although Private Key Switching is described as being performed by the key exchange unit 30 here, Private Key Switching can be considered as a part of the second Bootstrapping. In this case, the second Bootstrapping unit 17 may perform Private Key Switching, and the encryption processing device 1 may not include the key exchange unit 30.

The encryption processing device 1 inputs the TLWE ciphertext cc1 to the fourth operation unit 15 and performs the fourth homomorphic operation that obtains a TLWE ciphertext cc' from cc1−cb'.

The TLWE ciphertext cc' thus obtained is a ciphertext corresponding to a result ab of multiplication between the plaintext integer a and the plaintext integer b. However, since the denominator of the plaintext of the TLWE ciphertext cc' is $2t^2$ as described later, this ciphertext cannot be used in subsequent multiplication with a ciphertext having a plaintext with a denominator of 2t. Therefore, the encryption processing device 1 subsequently performs a process for converting the denominator of a plaintext to 2t.

The encryption processing device 1 inputs the TLWE ciphertext cc' to the first operation unit 12 and performs an operation of multiplying the TLWE ciphertext cc' by t. The encryption processing device 1 inputs the TLWE ciphertext cc' multiplied by t to the third Bootstrapping unit 18 and performs the third Bootstrapping, thereby obtaining a TLWE ciphertext cl. In more detail, the third Bootstrapping unit 18 performs BlindRotate and SampleExtract for the TLWE ciphertext cc' multiplied by t to obtain the TLWE ciphertext cd. The encryption processing device 1 inputs the TLWE ciphertext cd to the second operation unit 13 and performs an operation of adding the TLWE ciphertext cd to the TLWE ciphertext cc' multiplied by t, cc'×t+cd−(0, ¼). The encryption processing device 1 (the third Bootstrapping unit 18) performs Public Key Switching for the result of that operation to obtain a TLWE ciphertext cl corresponding to lower bits of the multiplication result.

In order to obtain higher bits of the multiplication result as necessary, the encryption processing device 1 inputs the ciphertext cl corresponding to the lower bits of the multiplication result to the fourth Bootstrapping unit 19 and performs the fourth Bootstrapping, thereby obtaining a TLWE ciphertext cl'. In more detail, the fourth Bootstrapping unit 19 performs BlindRotate and SampleExtract for the TLWE ciphertext cl to obtain the TLWE ciphertext cl'. The encryption processing device 1 inputs the TLWE ciphertext cl' and the TLWE ciphertext cc' to the third operation unit 14 and performs an operation of subtracting cl' from cc', cc'−cl' to calculate a TLWE ciphertext cu. The encryption processing device 1 (the fourth Bootstrapping unit 19) performs Public Key Switching for the result of the operation by the third operation unit 14, that is, the TLWE ciphertext cu, to obtain a TLWE ciphertext cu' corresponding to the higher bits of the multiplication result.

The lower bits and the higher bits of the multiplication result are a predetermined number of lower bits and the remaining bits, respectively, when the multiplication result is expressed in binary. This is the expression when t is a power of 2. For a different value, only the expression is changed while what is meant by the lower bits and the higher bits is essentially unchanged.

For the polynomial used in the fifth Bootstrapping and the sixth Bootstrapping in the pre-processing, adjustment is performed which adds an offset of ½ (½ of a slice obtained by dividing a circle group) to each term of the polynomial so as to enable the new TLWE ciphertexts ca and cb in which positive and negative values are successively arranged on a circle group {T} to be obtained, although the details will be described later. The adjustment of adding the offset of ½ (0.5) of the slice is also performed for each term of the stepped plaintext polynomial of the key switching key KS1.

Consequently, in the ciphertext corresponding to the multiplication result, positive and negative values are successively arranged on the circle group {T}, and more information can be stored as compared with a case where such an offset is not added.

The ciphertext of the multiplication result divides a circle group into $2t^2$, as described below. In order to enable the offset of ½ (0.5) that is not an integer to be expressed, a process of converting the TLWE ciphertext cb' used in the middle of calculation from 2t divisions of the TLWE ciphertext cb to $4t^2$ divisions that is twice $2t^2$ in the first Bootstrapping.

Gate Bootstrapping explained in TFHE is described in detail.

Gate Bootstrapping is a method for making fully homomorphic encryption, which has not been practical because of a huge amount of data and its operation time, practical.

TFHE in the aforementioned paper uses encryption in which LWE (Learning with Errors) encryption is configured over a circle group, so called "TLWE encryption", and achieves various types of homomorphic logical operations (and furthermore any operation such as addition and multiplication) between TLWE ciphertexts at high speed with small data size while making an error in an operation small.

An input of Gate Bootstrapping in TFHE is a TLWE ciphertext encrypted with a private key.

TFHE achieves fully homomorphic encryption (FHE) based on TLWE ciphertexts.

TLWE encryption is a unique case of LWE encryption (obtained by defining LWE encryption over a circle group) that is one type of lattice-based cryptography.

TLWE encryption is additively homomorphic and is known as being able to perform an additive operation between plaintexts encrypted by TLWE encryption without decrypting ciphertexts.

Figure 3:
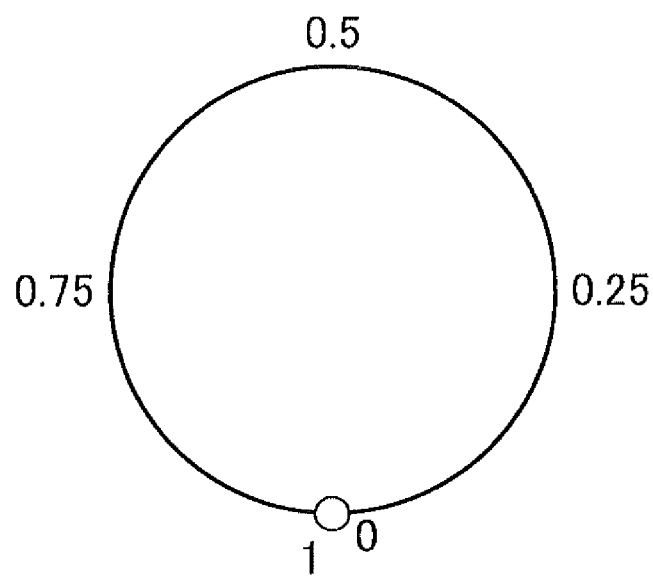
FIG. 3 is an image diagram for explaining a circle group that TLWE encryption has as a plaintext.

FIG. 3 is an image diagram for explaining a circle group that TLWE encryption has as a plaintext.

TLWE encryption has any point on a circle group {T} illustrated in FIG. 3, which moves from 0 to 1 with a real number precision and, when reaching 1, returns to 0, and uses a range near 0 (including an error) and a range near (including an error) as a plaintext.

The point on the circle group {T} is also described as an "element" in the present specification.

An encryption processing device handling TFHE performs a generic homomorphic operation, for example, an additive operation as an operation between such TLWE ciphertexts, and makes an error of the operation result fall within an appropriate range by Gate Bootstrapping, thereby achieving fully homomorphic encryption (FHE) that allows a logical operation to be performed again (in the latter stage).

[TLWE Encryption]

TLWE encryption is described.

A vector [a] in which N random numbers are arranged to be uniformly distributed is prepared as an element on the circle group {T}. In addition, a private key vector [s] in which N values each being 0 or 1 are arranged at random is prepared.

Assuming that a random number in the Gaussian distribution (the normal distribution) in which an average value is a plaintext µ and a variance is preset to α is e, an example of a TLWE ciphertext is a pair ([a], [s]·[a]+e).

An average value of e when an infinite number of TLWE ciphertexts are created for the same plaintext µ is a plaintext µ, where µ is a plaintext without an error and e is a plaintext with an error.

Symbol "·" represents a dot product of vectors. This description is also applied to the following descriptions.

When [s]·[a]+e described above is written as b, the TLWE ciphertext can be represented as ([a], b).

A function $\varphi_s(([a], b)=b-[s]\cdot[a]=e$ is a function of decrypting the TLWE ciphertext. Since TLWE encryption adds a dot product of a private key vector and a random number vector and an error to a plaintext to encrypt the plaintext, TLWE encryption can be decrypted with the error by calculating the dot product of the private key vector and the random number vector. At this time, if the private key vector is unknown, a component serving as the dot product cannot be calculated, and therefore decryption cannot be performed.

This TLWE encryption is additively homomorphic and allows an additive operation between plaintexts of TLWE ciphertexts to be performed without decrypting the ciphertexts.

When ([a]+[a'], b+b') obtained by adding two TLWE ciphertexts ([a], b) and ([a'], b') together as they are is input to the aforementioned decryption function $\varphi_s$, a sum of the two plaintexts is obtained as represented by $\varphi_s(([a]+[a'], b+b'))=(b+b')-[s]\cdot([a]+[a'])=(b-[s]\cdot[a])+(b'-[s]\cdot[a'])=\varphi_s([a], b)+\varphi_s([a'], b')$.

It is thus found that a TLWE ciphertext is a ciphertext obtained by "additive homomorphic encryption".

In TFHE in the aforementioned paper, various operations are achieved by repeating performing an additive operation for TLWE ciphertexts each obtained by adding an error to a plaintext and reducing an error by Gate Bootstrapping.

In the following descriptions, a trivial ciphertext such as ([0], µ) is a TLWE ciphertext that can be decrypted with any private key, that is, a ciphertext that can be decrypted with any private key to provide the same plaintext.

In ([0], µ), [0] represents a zero vector.

Although the trivial ciphertext can be handled as a TLWE ciphertext, it can be considered as a state where a plaintext is placed in the ciphertext substantially as it is.

When the decryption function $\varphi_s$ is applied to the TLWE ciphertext ([0], µ), the private key [s] is multiplied by the zero vector [0] to disappear as represented by $\varphi_s(([0], \mu))=\mu-[s]\cdot 0=\mu$. The plaintext µ is thus obtained easily. Such a ciphertext is a trivial ciphertext with regard to the plaintext µ.

A finite cyclic group used in Gate Bootstrapping in TFHE is described.

Gate Bootstrapping uses the property of a factor ring of a polynomial ring as a finite cyclic group.

The following description explains that a finite cyclic group is present in a factor ring of a polynomial ring.

An n-th order polynomial is generally represented by $a_n x^n + a_{n-1} x^{n-1} + \ldots + a_0$.

These all sets form a commutative group for the sum f(x)+g(x) of polynomials.

Further, the product f(x)g(x) of polynomials has properties identical to those of the commutative group except that an inverse element is not necessarily present. Such a structure is called "monoid".

Regarding the sum and the product of polynomials, the distributive property is established as follows.

$$f(x)\{g(x)+g'(x)\}=f(x)g(x)+f(x)g'(x)$$

Therefore, when the sum and the product of polynomials are defined by regarding polynomials as elements, a "ring" is formed, which is called a polynomial ring.

TFHE uses a polynomial ring including the circle group {T} as coefficients, and such a polynomial ring is represented as T[X].

When a polynomial T(X), which is a polynomial ring, is decomposed into $T[X](X^n+1)+T[X]$, and only the second terms (the remainders) are extracted and collected, a factor ring of a polynomial ring is obtained because the second terms also have the property of a "ring".

In TFHE, the factor ring of a polynomial ring is represented as $T[X]/(X^n+1)$.

A polynomial $F(X)=\mu X^{n-1}+\mu X^{n-2}+ \ldots +\mu X+\mu$ is extracted by using a desired coefficient $\mu$ ($\mu$ belongs to T) as an element of the factor ring of the polynomial ring $T[X]/(X^n+1)$.

When the element $F(X)$ of the factor ring of the polynomial ring is multiplied by X, $\mu X^{n-1}+\mu X^{n-2}+ \ldots +\mu X-\mu$ is obtained, the coefficient of the top term appears as a constant term with a sign reversed from positive to negative. This is because only the top term can be divided by $X^n+1$ as $\mu X^n=\mu(X^n+1)-\mu$ after multiplication by X, although terms of order n-2 or less cannot be divided by $X^n+1$ after multiplication by X. Since the remainder obtained by division by $X^n+1$ is considered, only $-\mu$ appearing as a remainder in the right side remains.

When multiplication by X is further performed, the same phenomenon happens again as represented by $\mu X^{n-1}+\mu X^{n-2}+ \ldots +\mu X^2-\mu X-\mu$ (the coefficient of the top term appears as a constant term with a sign reversed from positive to negative).

When this multiplication is repeated n times, $-\mu X^{n-1}-\mu X^{n-2} \ldots -\mu X-\mu$ is obtained, so that the coefficients of all terms become negative.

When multiplication by X is further continued, the coefficient of the top term becomes positive from negative and appears as a constant term as represented by $$-\mu X^{n-1}-\mu X^{n-2} \ldots -\mu X+\mu,$$

$$-\mu X^{n-1}-\mu X^{n-2} \ldots +\mu X+\mu.$$

When multiplication by X is repeated 2n times in total, the multiplication result returns to the original element of the factor ring of the polynomial ring $F(X)=\mu X^{n-1}+\mu X^{n-2}+ \ldots +\mu X+\mu$. As described above, the highest-order coefficient ($\mu$) appears as the lowest-order constant term with a reversed sign ($-\mu$), and terms are shifted by one in whole.

That is, the polynomial $F(X)=\mu X^{n-1}+\mu X^{n-2}+ \ldots +\mu X+\mu$ is a finite cyclic group of order 2n in a ring that is the factor ring of the polynomial ring $T[X]/(X^n+1)$.

In TFHE, an encryption processing device achieves fully homomorphic encryption by using such properties of the polynomial $F(X)$ based on a factor ring of a polynomial ring.

Regardless of whether the exponent part of X is positive or negative, when the element $F(X)$ of the factor ring of the polynomial ring is multiplied by X n times, the signs of all the terms are reversed, and when this multiplication is repeated 2n times, the signs of all the terms return to the original signs.

In addition, multiplication by $X^{-1}$ is an inverse operation of multiplication by X. Therefore, when multiplication by $X^{-1}$ is repeated, a change opposite to the case where multiplication by X is repeated occurs. When multiplication by $X^{-1}$ is repeated n times, the signs of all the terms are reversed, and when this multiplication is repeated 2n times, the signs of all the terms return to the original signs.

As described above, when the element $F(X)$ of the factor ring of the polynomial ring is repeatedly multiplied by X or $X^{-1}$ n times, the signs of all the terms are reversed, and when this multiplication is repeated 2n times, the signs of all the terms return to the original signs.

When attention is paid to the fact that this cyclic group can be rotated in either direction, expressions such as multiplication is repeated -n times and multiplication is repeated -2n times may be used for the sake of simplicity. These expressions are merely convenient expressions for explaining the theory. When the present invention is put into practice, for example, in a case where multiplication by $X^a$ is repeated -b times, multiplication by $X^{-a}$ may be repeated b times or multiplication by $X^{2n-a}$ may be repeated b times. Other modifications may be made, as long as the same result can be achieved.

[TRLWE Encryption]

Gate Bootstrapping uses encryption called TRLWE encryption in addition to TLWE encryption.

TRLWE encryption is described.

The character R in TRLWE encryption means a ring, and TRLWE encryption is LWE encryption configured by a ring. TRLWE is also additive homomorphic encryption, as TLWE encryption is.

A ring in TRLWE encryption is the factor ring of the polynomial ring $T[X]/(X^n+1)$ described above.

In order to obtain TRLWE encryption, elements of the factor ring of the polynomial ring $T[X]/(X^n+1)$ are selected at random.

In fact, n coefficients in an (n-1) th order polynomial are selected as uniformly distributed random numbers from the circle group $\{T\}$.

When the order of the polynomial is n-1, the polynomial is not divided by $X^n+1$, and it is not necessary to consider a remainder. Therefore, it is assumed that the (n-1) th order polynomial is a polynomial $a(X)$.

A polynomial $s(X)$ used as a private key is structured as follows, by selecting n values each being 0 or 1 at random.

$$s(X)=s_{n-1}X^{n-1}+s_{n-2}X^{n-2}+ \ldots s_1X+s_0$$

Assuming that n random numbers $e_i$ are random numbers in the Gaussian distribution (the normal distribution) in which an average value is a plaintext $\mu_i$ and a variance is $\alpha$, the following polynomial $e(X)$ is structured from these random numbers.

$$e(X)=e_{n-1}X^{n-1}+e_{n-2}X^{n-2}+ \ldots e_1X+e_0$$

Decomposition of $s(X) \cdot a(X)+e(X)$ into $f(X)(X^n+1)+b(X)$, and $b(X)$ is obtained.

Consequently, $(a(X), b(X))$ is obtained as a TRLWE ciphertext.

In TRLWE encryption, since encryption is performed using random numbers similarly to TLWE encryption, innumerable ciphertexts can correspond to the same private key and the same plaintext.

In addition, in TRLWE encryption, $g(X)$ determined in such a manner that $\varphi_s$ becomes an element of $T[X]/(X^n+1)$ serves as a decryption function, where $\varphi_s((a(X), b(X))=b(X)-s(X) \cdot a(X)+g(X)(X^n+1)$, as in TLWE encryption. In other words, $(b(X)-s(X) \cdot a(X))$ mod$(X^n+1)$ serves as a decryption function, where mod is a remainder of division.

[Gadget Decomposition]

Gadget Decomposition is described.

A coefficient in a polynomial used in a TRLWE ciphertext is a real number that is an element of the circle group $\{T\}$ in FIG. 3 and is equal to or larger than 0 and less than 1, and only has a fractional part.

An operation of decomposing this coefficient into several bits in binary notation is defined as Gadget Decomposition (Dec) in TFHE in the aforementioned paper.

For example, assuming that the degree n of the polynomial $F(X)$ of a TRLWE ciphertext is 2, one unit of decomposition is $Bg=2^2$, and decomposition into $l=3$ elements is performed. At this time, each element is arranged to enter between $-Bg/2$ and $Bg/2$.

ATRLWE ciphertext is a combination of two polynomials like $(a(X), b(X))$ as described above. Therefore, a TRLWE ciphertext d can be written as $$d=[0.75X^2+0.125X+0.5, 0.25X^2+0.5X+0.375]$$

by being regarded as a two-dimensional vector having polynomials that serve as elements of a factor ring of a polynomial ring, as elements. Accordingly, in the following descriptions, each element is decomposed into the form of a sum of powers of $Bg^{-1}=0.25$.

Since $0.75=-0.25$ is established on the circle group $\{T\}$, decomposition can be performed as follows.

$$d = [0.75X^2 + 0.125X + 0.5, 0.25X^2 + 0.5X + 0.375]$$
$$= [-0.25X^2 + 0.125X + 0.5, 0.25X^2 + 0.5X + 0.25 + 0.125]$$
$$= [0.25 \times (-X^2 + 2) + 0.25^2 \times 2X + 0.25^3 \times 0, 0.25 \times (X^2 + 2X + 1) + 0.25^2 X^2 \times 2 + 0.25^3 \times 0]$$

Therefore, when Gadget Decomposition is performed, a vector $$\text{Dec}(d)=[-X^2+2, 2X, 0, X^2+2X+1, 2, 0]$$

is obtained.

An operator H of an inverse transform from a vector to a ciphertext is also defined.

When the description is provided based on the example described above, a matrix $$H = \begin{pmatrix} 0.25 & 0 \\ 0.25^2 & 0 \\ 0.25^3 & 0 \\ 0 & 0.25 \\ 0 & 0.25^2 \\ 0 & 0.25^3 \end{pmatrix}$$

becomes the operator H of the inverse transform. A TRLWE ciphertext d is obtained by performing an operation $\text{Dec}(d) \cdot H$. The lower bits are rounded off.

It can also be said that an operation of obtaining $[v]$ that makes $\|d-[v] \cdot H\|$ minimum with respect to the TRLWE ciphertext d is Gadget Decomposition. Here, $\|\cdot\|$ is a vector norm (length).

TRLWE ciphertexts $Z_i=(a(X), b(X))$ calculated from polynomials in which all coefficients of $e(X)$ are generated by random numbers having an average value of 0 and a variance of $\alpha$ are created. The number of the created ciphertexts being $2l$.

The plaintext $\mu$ is encrypted in the following manner, whereby the following ciphertext k is obtained.

$$k = \begin{pmatrix} Z_1 \\ Z_2 \\ \vdots \\ Z_{2\ell} \end{pmatrix} + \mu \times H$$

A ciphertext that can be expressed as this ciphertext k is called a TRGSW ciphertext.

The TRGSW ciphertext configures a Bootstrapping Key used below.

The Bootstrapping Key is described.

The Bootstrapping Key is used as a method of encrypting a private key in order to use the private key in Gate Bootstrapping.

Separately from the private key $[s]$ (Nth order) used for TLWE ciphertexts, each element of a private key $[s']$ for encrypting the private key $[s]$ is selected to be either of two values, i.e., 0 or 1 for use in Gate Bootstrapping.

It is necessary to make the order of the private key $[s']$ the same as the order n of a polynomial used in TRLWE encryption.

A TRGSW ciphertext is created for each element of the private key $[s]$.

When decryption with the private key $[s']$ is performed, $2l$ TRLWE ciphertexts $Z_j$ are created where $\varphi_{s'}(Z_j)=0$ is satisfied.

Then, $BK_i$ is defined as $$Bk_i = \begin{pmatrix} Z_1 \\ Z_2 \\ \vdots \\ Z_{2\ell} \end{pmatrix} + s_i \cdot H$$

as in the above-described configuration of the TRGSW ciphertext.

A set of TRGSW ciphertexts formed by using different $Z_j$ for respective elements of the private key $[s]$ is referred to as a Bootstrapping Key (BK). That is, BK is a set of N TRGSW ciphertexts.

The cross product of the TRGSW ciphertext $BK_i$ and the TRLWE ciphertext d is defined as $BK_i \times d = \text{Dec}(d) \cdot BK_i$.

Gadget Decomposition is an operation of obtaining $[v]$ that makes $\|d-[v] \cdot H\|$ minimum with respect to the TRLWE ciphertext d.

Therefore, by using $[v]=\text{Dec}(d)$ and an error $(\varepsilon_a(X), \varepsilon_b(X))$, $[v] \cdot H = d + (\varepsilon_a(X), \varepsilon_b(X))$ can be written.

As a result, $BK_i \times d = \text{Dec}(d) \cdot BK_i$ $$= \vec{v} \cdot \begin{pmatrix} Z_1 \\ Z_2 \\ \vdots \\ Z_{2\ell} \end{pmatrix} + s_i \times \vec{v} \cdot H$$

is obtained.

When the left side calculates the dot product, and $[v] \cdot H = d + (\varepsilon_a(X), \varepsilon_b(X))$ is substituted into the right side, $$= \sum_{j=1}^{2\ell} v_j \times Z_j + s_i \times (d + (\epsilon_a(X), \epsilon_b(X)))$$
$$= \sum_{j=1}^{2\ell} v_j \times Z_j + s_i \times d + s_i \times (\epsilon_a(X), \epsilon_b(X))$$

is obtained, and becomes the same as calculation of the sum of the following three ciphertexts c1, c2, and c3.

$c_1 = \sum_{j=1}^{2l} v_j \times Z_j$ $c_2 = s_i \times d$ $c_3 = s_i \times (\epsilon_a(X), \epsilon_b(X))$ Since TRLWE encryption is additive homomorphic encryption, calculating the sum of ciphertexts is the same as calculating the sum of plaintexts.

Since $c_1$ is obtained by adding several times of $Z_j$, expected values of the respective coefficients of the plaintext polynomial $\varphi_s(c_1)$ are all 0.

In addition, $\varphi_s(c_3)$ obtained by decryption is set to be sufficiently small also in the subsequent operations, because the magnitude of an absolute value of each coefficient of a plaintext polynomial can be adjusted by a system parameter.

In this case, $\varphi_s(BK_i \times d) = \varphi_s(s_i \times d)$ is obtained, but the calculation result is the sum of the above three ciphertexts c1, c2, and c3 regardless of whether $s_i$ is 0 or 1. Whether $s_i$ is 0 or 1 cannot be determined by a simple comparison.

Assuming that there are TRLWE ciphertexts $d_0$ and $d_1$ respectively corresponding to two plaintext polynomials $\mu_0$ and $\mu_1$, when $d = d_1 - d_0$ is substituted, and $d_0$ is finally added, the following CMux function is completed.

$$CMux(BK_i, d_0, d_1) = BKi \times (d_1 - d_0) + d_0 = Dec(d_1 - d_0) \cdot BK_i + d_0$$

The CMux function outputs a TRLWE ciphertext of the plaintext polynomial $\mu_0$ without decrypting it when $s_i$ is 0, and outputs a TRLWE ciphertext of the plaintext polynomial i without decrypting it when $s_i$ is 1.

Although the CMux function can calculate the TRLWE ciphertext of which the plaintext polynomial is $\mu_0$ or $\mu_1$, it is not possible to know which one is selected, from the calculation result without decryption.

Binary Gate Bootstrapping in TFHE is performed using various information described above.

Binary Gate Bootstrapping is configured by three steps described below, i.e., (1) BlindRotate, (2) SampleExtract, and (3) Public Key Switching.

Figure 4:
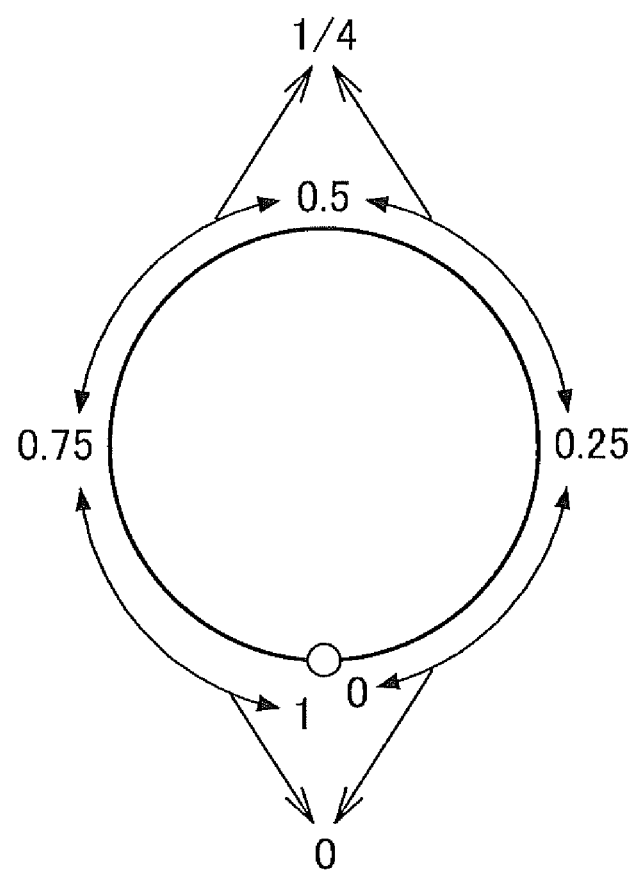
FIG. 4 is an operation image diagram of binary Gate Bootstrapping.

FIG. 4 is an operation image diagram of binary Gate Bootstrapping.

Binary Gate Bootstrapping reduces an error for a plaintext included in a result of a homomorphic operation between TLWE ciphertexts by three steps descried below.

In the following descriptions, unless otherwise specified, a plaintext means a result of an operation between plaintexts obtained as a result of an operation between TLWE ciphertexts.

A plaintext in a section from 0 to 0.25 (¼) or 0.75 (¾) to 1 on the circle group {T} in FIG. 3 is converted to a TLWE ciphertext 0, and a plaintext in a section from 0.25 (¼) to 0.75 (¾) is converted to a ciphertext 0.25 (¼).

An error added to the plaintext in this conversion is any error in a range of ⅟16.

(1) BlindRotate

BlindRotate is performed as the first step of Gate Bootstrapping.

BlindRotate is a process of creating a TRLWE ciphertext.

In BlindRotate, from a trivial TRLWE ciphertext (0, T(X)) whose plaintext is a polynomial T(X), a TRLWE ciphertext multiplied by $X^{-\varphi s(c')}$ is obtained without decryption. "0" indicates a 0th degree polynomial 0.

Here, $\varphi s(c')$ is a plaintext obtained by applying a decryption function to the following LWE ciphertext c'.

In BlindRotate, the following polynomial T(X)

$T(X) = F(X) \cdot X^{n/2}$ is prepared, which is obtained by multiplying the following polynomial F(X)

$F(X) = \mu X^{n-1} + \mu X^{n-2} + \ldots \mu X + \mu$ where $\mu = ⅛$,
that forms the above-described finite cyclic group and serves as a test vector, by $X^{n/2}$.

It is assumed that there is a TLWE ciphertext c obtained by encrypting the plaintext $\mu 1$ with the private key [s].

Each element of this TLWE ciphertext c=([a], b) is multiplied by 2n and is then rounded off, whereby a LWE ciphertext c'=([a'], b') is obtained.

When the LWE ciphertext c'=([a'], b') is decrypted, $\mu 1' = \varphi_s(c') \approx 2n \times \varphi_s(c) = 2n\mu 1$ is obtained.

Since a rounding-off error can be generated, they do not always match exactly. However, as n becomes larger, the error becomes smaller relatively.

A trivial TRLWE ciphertext (0, T(X)) whose plaintext is the polynomial T(X) is prepared, and it is assumed that $A_0 = X^{-b'} \times (0, T(X)) = (0, X^{-b'} \times T(X))$, where 0 indicates a 0th order polynomial 0. At this time, since b' is an integer, exponentiation can be defined naturally. Actually, it suffices to circulate a predetermined number of coefficients of terms of the polynomial of the TRLWE ciphertext.

Subsequently, $A_i = CMux(BK_i, A_{i-1}, X^{a'i} A_{i-1})$ is calculated in turn by using $BK_i$ that is the Bootstrapping Key described above. Since a'i is an integer also in this expression, a power of X can be defined naturally. Similarly, a power of X is not calculated, but it suffices to circulate a predetermined number of coefficients of the respective terms of the polynomial as elements of the TRLWE ciphertext $A_{i-1}$.

Accordingly, the plaintext is not changed when $s_i$ is 0, and multiplication by $X^{a'i}$ is performed in turn when $s_i$ is 1.

Therefore, calculation is repeated as represented by $\phi_s(A_0) = X^{-b'} T(X)$ $\phi_s(A_1) = X^{s_1 a_1' - b'} T(X)$ $\phi_s(A_2) = X^{s_2 a_2' + s_1 a_1' - b'} T(X)$ then $\phi_s(A_n) = X^{\sum_{i=1}^{N} s_i \times a_i' - b'} T(X)$ is obtained.

Here, $\sum_{i=1}^{N} s_i \times a_i' - b'$ is equal to the decryption function $\varphi s(c')$ with the sign reversed. Therefore, $\phi_s(A_n) = X^{-\phi s(c')} T(X)$ is obtained. Here, $\varphi_s(A_n)$ is a polynomial obtained by multiplying the polynomial T(X) by $X^{-1}$ $\mu 1'$ times, and $A_n$ is the ciphertext thereof.

At this point, it should be noted that an error component of an error-containing plaintext e of the initially set TLWE ciphertext c appears as the amount by which the polynomial T(X) is rotated and does not appear as the magnitude of the value of the coefficient of each term. In TFHE, the error is essentially reduced by this mechanism.

In addition, in association with the plaintext $\mu 1$ of the TLWE ciphertext c related to BlindRotate, unique values (up to 2n values including n coefficients and n values obtained by reversing the signs of the coefficients) in accordance with the number of times $\mu 1'$ (=2n$\mu 1$) of multiplying the polynomial T(X) by $X^{-1}$ are obtained as the coefficients of the constant terms of the plaintext polynomial, and therefore they can be regarded as a kind of lookup table.

(2) SampleExtract

In the plaintext polynomial $\varphi_s(A_n)$ obtained by decrypting the TRLWE ciphertext $A_n$ obtained by BlindRotate in (1), $n/2-\varphi_s(c')$ terms from the lowest term have a coefficient of $-\mu$. When $\varphi_s(A_n)$ is negative, coefficients are $-\mu$ from the highest term in turn conversely.

When attention is paid only to a constant term of the plaintext polynomial $\varphi_s(A_n)$ obtained by decrypting the $$\sum_{i=1}^{n} b_i X^{i-1} - \sum_{i=1}^{n}\sum_{j=1}^{n} a_i s'_j X^{(i+j-2)} = \sum_{i=1}^{n} b_i X^{i-1} - \sum_{i=1}^{n}\sum_{j=i-1}^{n+i-2} a_i s'_{j-i+2} X^j$$

$$= \sum_{i=1}^{n} b_i X^{i-1} - \sum_{i=1}^{n}\sum_{j=i-1}^{n} a_i s'_{j-i+2} X^j - \sum_{i=1}^{n}\sum_{j=n}^{n+i-2} a_i s'_{j-i+2} X^j$$

$$= \sum_{j=1}^{n} b_j X^{j-1} - \sum_{j=0}^{n-1}\sum_{i=1}^{j+1} a_i s'_{j-i+2} X^j - \sum_{j=n}^{2n-2}\sum_{i=j-n+2}^{n} a_i s'_{j-i+2} X^j$$

$$= \sum_{j=0}^{n-1} b_{j+1} X^j - \sum_{j=0}^{n-1}\sum_{i=0}^{j} a_{i+1} s'_{j-i+1} X^j - \sum_{j=0}^{n-2}\sum_{i=j-n+1}^{-1} a_{i+n+1} s'_{j-i+1} X^{j+n}$$

$$= \sum_{j=0}^{n-2} b_{j+1} X^j + b_n X^{n-1} - \sum_{j=0}^{n-2}\sum_{i=0}^{j} a_{i+1} s'_{j-i+1} X^j - \sum_{i=0}^{n-1} a_{i+1} s'_{n-i} X^{n-1} - \sum_{j=0}^{n-2}\sum_{i=j-n+1}^{-1} a_{i+n+1} s'_{j-i+1} X^{j+n}$$

$$= \sum_{j=0}^{n-2}\left(b_{j+1} X^j - \sum_{i=0}^{j} a_{i+1} s'_{j-i+1} X^j - \sum_{i=j-n+1}^{-1} a_{i+n+1} s'_{j-i+1} X^{j+n}\right) + b_N X^{n-1} - \sum_{i=0}^{n-1} a_{i+1} s'_{n-i} X^{n-1}$$

TRLWE ciphertext $A_n$, the constant term is if $\varphi_s(c')$ is equal to or greater than $n/2$ and less than $3n/2$, that is, $\varphi_s(c)$ is $\frac{1}{2}\pm\frac{1}{4}$. Otherwise, i.e., if $\varphi_s(c)$ is $\pm\frac{1}{4}$, the constant term is $-\mu$.

SampleExtract is a process for extracting only the coefficient of the constant term of the plaintext polynomial $\varphi_s(A_n)$ from the TRLWE ciphertext $A_n$ obtained by BlindRotate in (1) without decrypting the TRLWE ciphertext $A_n$, thereby obtaining a TLWE ciphertext cs.

As described above, the error added to the TLWE ciphertext c that is the first input and the error added by rounding off affect only the position of the boundary at which the plaintext $\mu$ and the plaintext $-\mu$ of the constant terms change, and the influence of those errors on the magnitude of the coefficients of the constant terms is negligibly small. That is, it can be interpreted that an input error is eliminated. Here, a width in which there is no problem even if the boundary at which the value of the plaintext of the constant term changes moves is a limit of the error with which the process of Bootstrapping can be correctly performed, and serves as a mechanism in which a trade-off described below occurs.

The process for obtaining the TLWE ciphertext cs is described.

All TRLWE ciphertexts can be expressed as $(A(X), B(X))$ by putting polynomials as follows $$A(X)=\Sigma_{i=1}^{n} a_i X^{i-1}$$

$$B(X)=\Sigma_{i=1}^{n} b_i X^{i-1},$$

where n is the order.

When decryption with the private key [s'] is performed, the expression can be expanded by putting a polynomial of the private key as $$S'(X)=\Sigma_{j=1}^{n} s'_j X^{j-1}.$$

Then, $$\phi_s(c)=B(X)-S'(X)\cdot A(X)=\Sigma_{i=1}^{n} b_i X^{i-1}-\Sigma_{i=1}^{n}\Sigma_{j=1}^{n} a_i s'_j X^{(i+j-2)}$$

is obtained.

The following operation is then performed with regard to this expression.

Since this is "a factor ring of a polynomial ring", the remainder when this is divided by $(X^n+1)$ is calculated. Then, $$\Sigma_{j=0}^{n-2}(b_{j+1} X^j - \Sigma_{i=0}^{j} a_{i+1} s'_{j-i+1} X^j + \\ \Sigma_{i=j-n+1}^{-1} a_{i+n+1} s'_{j-i+1} X^j)+b_N X^{n-1}-\Sigma_{i=0}^{n-1} a_{i+1} s'_{n-i} X^{n-1} = \\ \Sigma_{j=0}^{n-2}(b_{j+1} - \Sigma_{i=0}^{j} a_{i+1} s'_{j-i+1} + \\ \Sigma_{i=j-n+1}^{-1} a_{i+n+1} s'_{j-i+1})X^j + \\ (b_n - \Sigma_{i=0}^{n-1} a_{i+1} s'_{n-i})X^{n-1}$$

is obtained.

Further, when $$a'_i = \begin{cases} a_i & (i \geq 1) \\ -a_{i+n} & (\text{otherwise}) \end{cases},$$

is put, then $$= \sum_{j=0}^{n-2}\left(b_{j+1} - \sum_{i=0}^{j} a'_{i+1} s'_{j-i+1} - \sum_{i=j-n+1}^{-1} a'_{i+1} s'_{j-i+1}\right)X^j + \left(b_N - \sum_{i=0}^{n-1} a'_{i+1} s'_{n-i}\right)X^{n-1}$$

$$= \sum_{j=0}^{n-2}\left(b_{j+1} - \sum_{i=j-n+1}^{j} a'_{i+1} s'_{j-i+1}\right)X^j + \left(b_N - \sum_{i=0}^{n-1} a_{i+1} s'_{n-i}\right)X^{n-1}$$

$$= \sum_{j=0}^{n-2}\left(b_{j+1} - \sum_{i=0}^{n-1} a'_{i+j-n+2} s'_{n-i}\right)X^j + \left(b_n - \sum_{i=0}^{n-1} a_{i+1} s'_{n-i}\right)X^{n-1}$$

$$= \sum_{j=0}^{n-1}\left(b_{j+1} - \sum_{i=0}^{n-1} a'_{i+j-n+2} s'_{n-i}\right)X^j$$

is obtained, and coefficients of respective terms in a plaintext polynomial are obtained from $$\phi_s(c)=\Sigma_{j=0}^{n-1}(b_{j+1}-\Sigma_{i=0}^{n-1} a_{i+j-n+2}' s'_{n-i})X^j.$$

Among the obtained coefficients, a coefficient of a constant term is necessary. Therefore, when a coefficient for $j=0$ is extracted, $$b_1-\Sigma_{i=0}^{n-1} a_{i-n+2}' s'_{n-1}'$$

is obtained. When $$a_i''=a_{-i+2}',$$

is put, the extracted coefficient can be deformed to a decryption function of TLWE encryption as represented by $$b_1 - \Sigma_{i=0}^{n-1} a_{n-i}'' s_{n-i}' = b_1 - \Sigma_{i=0}^{n-1} a_i'' s_i' = b_1 - \vec{s'} \cdot \vec{a''} = \phi_s(\vec{a''}, b_1).$$

That is, when coefficients are extracted from the TRLWE ciphertext $A_n = (A(X), B(X))$ obtained by BlindRotate in (1) while the coefficients are set as $$a_i'' = \begin{cases} a_1 & (i = 1) \\ -a_{-i+n+2} & (\text{otherwise}) \end{cases},$$

a new TLWE ciphertext $([a''], b_1)$ is obtained which has, as a plaintext, the same value as a constant term of a plaintext polynomial corresponding to the original TRLWE ciphertext $A_n$. This new TLWE ciphertext is the output of SampleExtract and has either of two types of plaintexts, i.e., $-\mu$ or $\mu$.

A trivial ciphertext $([0], \mu)$ of which the plaintext is $\mu$ is added to the thus obtained TLWE ciphertext, thereby obtaining a TLWE ciphertext $cs = ([a''], b1) + ([0], \mu)$.

Specifically, since $\mu = \frac{1}{8}$ in the polynomial $F(X)$ as a test vector, a ciphertext of $-\frac{1}{8}$ or $\frac{1}{8}$ is obtained in this stage.

When the trivial TLWE ciphertext $([0], \frac{1}{8})$ of which the plaintext is $\mu = \frac{1}{8}$ is added to this ciphertext, $$-\frac{1}{8} + \frac{1}{8} = 0$$

$$\frac{1}{8} + \frac{1}{8} = \frac{1}{4}$$

are established, and thus a new TLWE ciphertext cs having either of two values, i.e., 0 or $\frac{1}{4}$ as the plaintext is obtained.

(3) Public Key Switching

The TLWE ciphertext cs obtained in SampleExtract in (2) is encrypted with the private key [s'], not with the private key [s].

Therefore, it is necessary to replace the key of the TLWE ciphertext cs with the private key [s] and return the state of the ciphertext to a state where encryption has been performed with the private key [s], without decrypting the TLWE ciphertext cs.

Therefore, a method of Public Key Switching is described.

The private key [s] for a TLWE ciphertext used in TFHE is an N-th order vector.

By using this vector, the private key [s'] that is an n-th order vector when the Bootstrapping Key has been created is encrypted.

That is, the private key [s'] is encrypted as a value obtained by shifting an element of the circle group {T} to each digit of a real number from 0 to 1 in binary notation, as represented by $s_i' \times 2^{-1} s_i' \times 2^{-2} s_i' \times 2^{-3} \ldots$ The private key is [s]. A "number of digits" t is a system parameter.

When decryption is performed with the private key [s], $$\phi_s(KS_{i,j}) = s_i' \times 2^{-j}$$

is obtained. This is a "KeySwitching key".

As described above, the TLWE ciphertext $cs = ([a], b)$ obtained in (2) is 0 or $\frac{1}{4}$ encrypted with the private key [s']. The number of elements of [a] is the same as that of the private key [s'] and is n.

When the elements are converted to t-bit fixed-point numbers by one each, the elements can be written in the following form.

$$a_i = \Sigma_{j=1}^t a_{i,j} \times 2^{-j}.$$

Although an error is increased in this stage, the maximum value of the absolute value can be limited by a system parameter.

As main processing of Public Key Switching, the following TLWE ciphertext cx is calculated.

$$cx = (\vec{0}, b) - \Sigma_{i=1}^n \Sigma_{j+1}^t a_{i,j} \times KS_{i,j}$$

Since the term $([0], b)$ is a trivial ciphertext, this term is b when being decrypted. A result of decrypting the TLWE ciphertext cx is as follows.

$$\phi_s(cx) = b - \Sigma_{i=1}^n \Sigma_{j=1}^t a_{i,j} \times s_i' \times 2^{-j} = b - \Sigma_{i=1}^n \Sigma_{j=1}^t s_i' \times a_{i,j} \times 2^{-j}$$

Since $s_i'$ is a constant for j, it is factored out as follows.

$$= b - \Sigma_{i=1}^n s_i' \Sigma_{j=1}^t a_{i,j} \times 2^{-j},$$

The expression obtained in decomposition into the fixed-point numbers is then substituted.

$$\approx b - \Sigma_{i=1}^n s_i' \times a_i = \phi_s((\vec{a}, b)) = \phi_s(c_s)$$

As a result, $$\phi_s(cx) \approx \phi_s(c_s)$$

is obtained. That is, key switching is successful.

The TLWE ciphertext cx obtained here is encrypted with the private key [s] that is the same as the private key for the TLWE ciphertext c used as the input of Gate Bootstrapping.

By performing the processing of Public Key Switching, the ciphertext returns to the TLWE ciphertext encrypted with the private key [s], so that its plaintext $\phi_s(cx)$ is 0 when $\phi_s(c)$ is in a range of $\pm\frac{1}{4}$, and is $\frac{1}{4}$ when $\phi_s(c)$ is in a range of $\frac{1}{2} \pm \frac{1}{4}$.

With the processing described above, a TLWE ciphertext is obtained as a result of Gate Bootstrapping, which is either of two values, i.e., 0 or $\frac{1}{4}$ and has any error within $\pm\frac{1}{16}$.

The maximum value of the error does not depend on the TLWE ciphertext c that is the input, and is a value fixed by a system parameter.

Therefore, the system parameter is set in such a manner that the maximum value of the error is any value within $\pm\frac{1}{16}$ that is the same range as that for a TLWE ciphertext as the input.

This setting enables a NAND operation to be performed any number of times. Here, the NAND operation is an operation having completeness by itself in the field of logical operations. That is, as long as the NAND operation can be realized, all logical operations can be performed by the combination thereof. Therefore, expressing any numerical value in binary enables all operations including addition and multiplication to be performed.

Examples of the error added to the "plaintext" of a TLWE ciphertext output from Gate Bootstrapping include an error added by rounding off a TLWE ciphertext, an error added by CMux, and an error when the TLWE ciphertext is converted to a fixed-point number in Public Key Switching. All these errors can be limited by a system parameter, and the system parameter can be adjusted in such a manner that an error for which all things are considered falls within $+\frac{1}{16}$.

The processing described above is processing of Gate Bootstrapping in TFHE.

As described above, TFHE is Bit-wise type homomorphic encryption that has zero or non-zero as the plaintext and enables a logical operation to be performed. However, the plaintext is a real number from 0 to 1 associated with the circle group {T}, as described with reference to FIG. 3. Therefore, by associating sections obtained by dividing the circle group {T} with integers in turn, TFHE can be applied as Integer-wise type homomorphic encryption having an integer as the plaintext.

A TLWE ciphertext used in TFHE is described as being an additive homomorphic type for a plaintext on the circle group in the aforementioned paper, and it is obvious that such a TLWE ciphertext enables addition (subtraction) to be performed.

A method described below further enables multiplication. When multiplication is enabled, TFHE can be used as homomorphic encryption that enables Integer-wise type four arithmetic operations in a more complete form, together with addition and a part of multiplication that are already known. Such TFHE enables more efficient processing as compared with bit-by-bit calculation by Bit-wise type TFHE.

Figure 5:
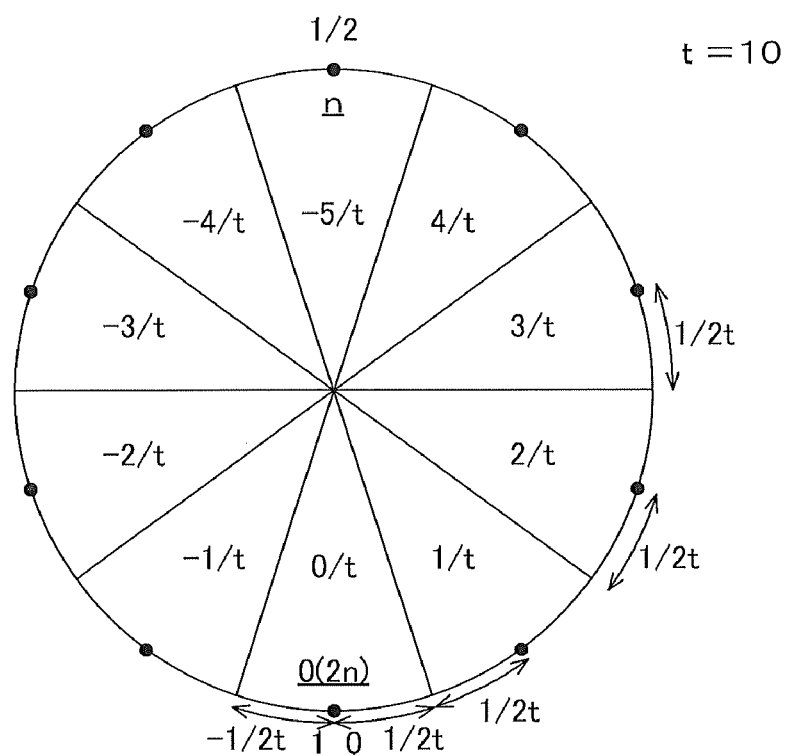
FIG. 5 is an explanatory diagram of TFHE applied to an Integer-wise type.

FIG. 5 is an explanatory diagram of TFHE applied to the Integer-wise type.

As illustrated in FIG. 5, the range from 0 to 1 associated with the circle group {T} is divided into t. For a TLWE ciphertext, possible values of the plaintext are t values obtained by dividing the range from 0 to 1, i.e., from $-(t/2)$ to $(t/2)-1$, and $(t/2)-1$ is the maximum value of the integer that can be recorded in one TLWE ciphertext.

As exemplified in FIG. 5, when t is set to 10 and the range from 0 to 1 is divided into 10, a ciphertext can express integers of $-5, -4, -3, -2, -1, 0, 1, 2, 3$, and 4. These integer values are respectively assigned to sections obtained by dividing the range from 0 to 1 of the circle group {T} into $t=10$ and centered at $-5/t, -4/t, -3/t, -2/t, -1/t, 0/t, 1/t, 2/t, 3/t$, and $4/t$. With this assignment, integers can successively be assigned counterclockwise from a region centered at ½, which expresses the minimum value when expressing an integer, as illustrated in FIG. 5.

As illustrated in FIG. 5, 0(1) on the circle group {T} is within a range of a region from $-1/(2t)$ to $1/(2t)$. As for a plaintext of a ciphertext on the circle group {T}, an offset based on, for example $1/(2t)$ is added to or subtracted from the state in FIG. 5 as necessary, so that the position in the region (the position on the circle group {T}) can be adjusted.

In the embodiment described below, the meaning of the number t of divisions of the circle group is different from that in the description related to FIG. 5, although it is essentially unchanged.

FIGS. 6A to 9 are explanatory diagrams of Integer-wise type TFHE in the present embodiment.

Figure 6A:
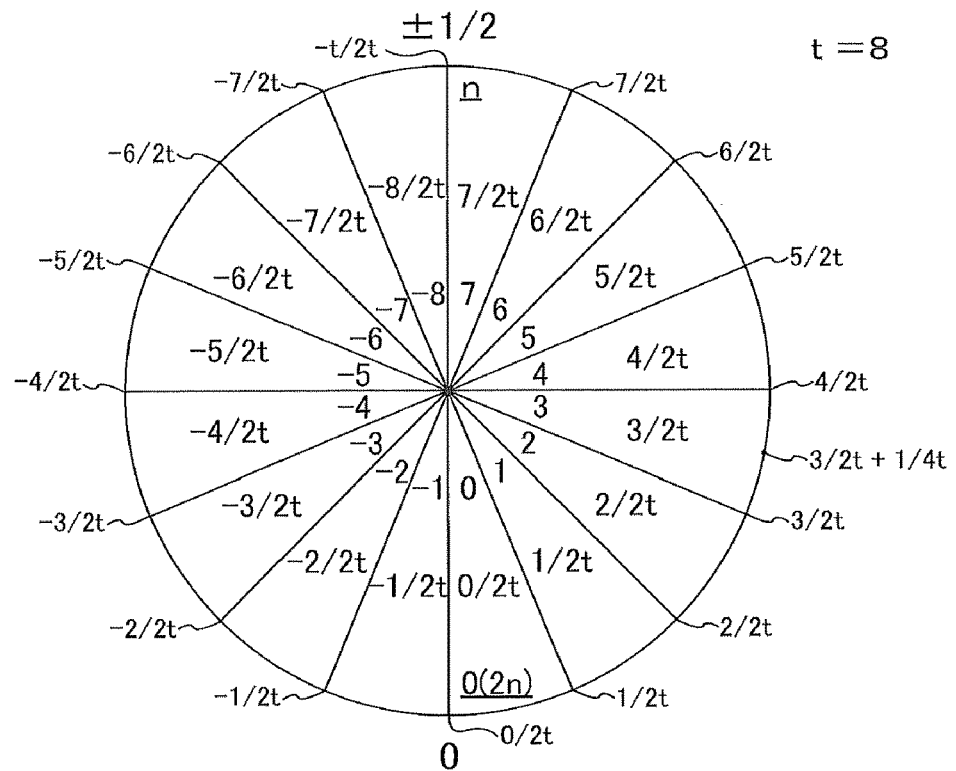
FIGS. 6A and 6B are explanatory diagrams of Integer-wise type TFHE in the present embodiment.
Figure 6B:
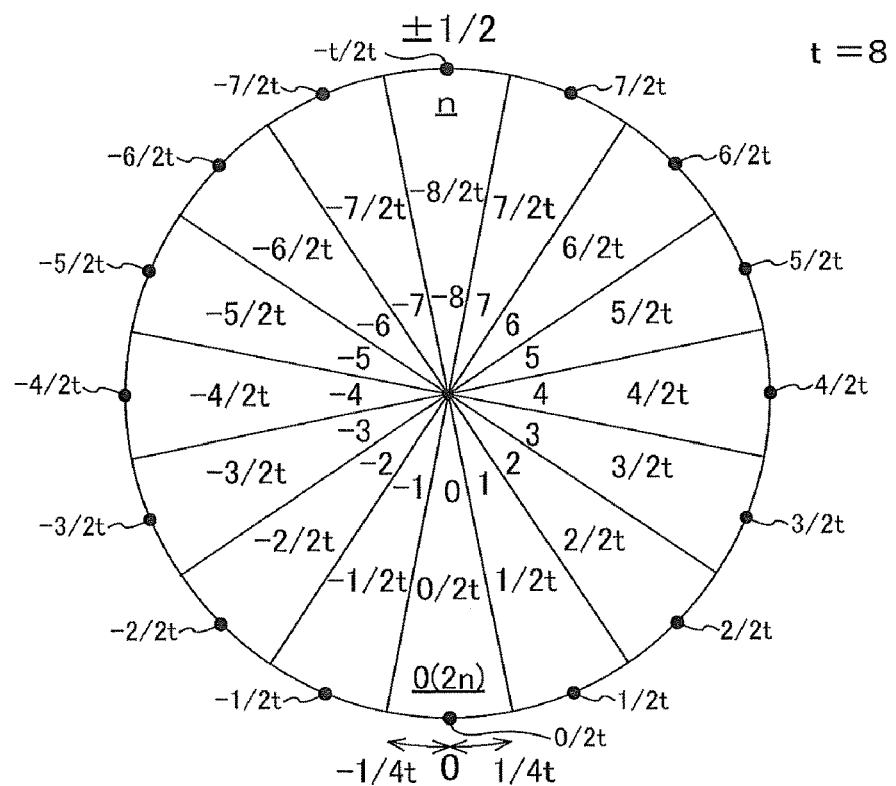

As illustrated in FIGS. 6A and 6B, ciphertexts serving as a multiplier and a multiplicand in the present embodiment each divide the entire range (0 to 1) of the circle group {T} into 2t.

Note that in FIGS. 6A to 9, the range of the circle group {T} from 0 to 1 may be written as $-0.5$ to $0.5$.

When the value of t is made larger and the circle group {T} is more finely divided, the integer value that can be recorded in a TLWE ciphertext can be made larger. However, when the division is made excessively finely, there is a problem that the range of the error to be added to the plaintext becomes excessively small, which results in decrease in the strength of the encryption. This point will be described later.

An integer value is assigned to each section with a width of $1/(2t)$ obtained by dividing the circle group {T}, and a range of possible values of a plaintext integer of a TLWE ciphertext is from $-t$ to $t-1$, where $t-1$ is the maximum integer value that can be recorded in one TLWE ciphertext, and $-t$ is the minimum integer value that can be recorded in one TLWE ciphertext.

As in the case of FIG. 5, a state in which no offset is added to a plaintext (the offset added to the plaintext is 0) is illustrated in FIG. 6B. FIG. 6A illustrates a state in which an offset of, for example, $+1/(4t)$ is added to the plaintext of the ciphertext illustrated in FIG. 6B. By adding the offset, the manner of slicing the circle group {T} can be changed.

In the following descriptions, it is assumed that the right half plane and the left half plane of the circle group are based on the state in FIG. 6A in which the offset of $1/(4t)$ is added.

In the state where no offset is added in FIG. 6B, 0(1) on the circle group {T} is within a slice from $-1/(4t)$ to $1/(4t)$.

By adding the offset as illustrated in FIG. 6A, the integer 0 can be associated with a slice (0/2t) starting from 0 on the circle group {T}. Another slice starts from X/2t (where X is a plaintext integer). Since 0 on the circle group corresponds to refer to the term of order 0 of the test vector polynomial used in processing using Bootstrapping, such addition of the offset is advantageous in that the arrangement order of coefficients becomes natural and easy to see. However, this is not an essential requirement in principle, and therefore it is also possible to adopt a different offset by performing appropriate adjustment with a test vector, pre-processing, post-processing, or the like.

In FIG. 6A, the plaintext with the offset added is located at the center of each slice (for example, a slice starting from $3/(2t)$) with an error range of $\pm 1/(4t)$. At this time, the average of the normal distribution is, for example, $3/(2t)+1/(4t)$, and plaintexts are distributed within the error range of $1/(4t)$ in most cases, so that the plaintexts are distributed at the center of the slice starting from $3/(2t)$.

Although the plaintext with the offset added is illustrated only in the slice of $3/(2t)$ in FIG. 6A, this illustration is merely an example. A plaintext with an offset added to a value serving as a starting point exists in all the slices. These descriptions are also applied to FIG. 7.

The ciphertext in FIGS. 6A and 6B divides the right half plane of the circle group {T} into t and the left half plane into t. The right half plane of the circle group {T} corresponds to 0 and positive plaintext integers (0 to $t-1$), and the left half plane corresponds to negative plaintext integers ($-1$ to $-t$).

The width of each block (slice) is $1/(2t)$.

Integer values are respectively assigned to slices that are obtained by dividing the range from 0 to 1 ($-½$ to $½$) of the circle group {T} into 2t and each start from $-t/(2t)$ to $(t-1)/(2t)$.

Non-negative integers are assigned to slices in the right half plane, respectively starting from $0/(2t), 1/(2t), \ldots, (t-3)/(2t), (t-2)/(2t)$, and $(t-1)/(2t)$. Negative integers are assigned to slices in the left half plane, respectively starting from $-t/(2t), -(t-1)/(2t), -(t-2)/(2t) \ldots, -1/(2t)$.

These slices are each centered at a value obtained by adding the offset of $+1/(4t)$ to the value serving as the starting point. The offset of $1/(4t)$ corresponds to half of the slice width of $1/(2t)$. When the offset of $1/(4t)$ is included in the integer representation, it can be represented as an offset of $+0.5$ for convenience.

As illustrated in FIG. 6A, when $2t=16$ ($t=8$) and the range of the circle group is divided into 16, integers from 0 to 7 ($=t-1$) can be expressed by the right half plane of the circle group {T}, and integers from $-8(=-t)$ to $-1$ can be expressed by the left half plane. That is, the entire ciphertext can express integers of $-8, -7, -6, -5, -4, -3, -2, -1, 0, 1, 2, 3, 4, 5, 6$, and 7.

These integer values are assigned to sections obtained by dividing the range of the circle group {T} into $2t=16$ and starting from $-8/(2t), -7/(2t), -6/(2t), -5/(2t), -4/(2t), -3/(2t), -2/(2t), -1/(2t), 0/(2t), 1/(2t), 2/(2t), 3/(2t), 4/(2t),$ 5/(2t), 6/(2t), and 7/(2t), respectively. Integers are successively assigned counterclockwise from the region starting from ½.

Considering the above-described offset of 0.5, the slice starting from, for example, 1/(2t) on the right half plane is the slice centered at 1.5/(2t), and the slice starting from, for example, −8/(2t) on the left half plane is the slice centered at −7.5/(2t). Integers expressed with the offset are −7.5, −6.5, −5.5, −4.5, −3.5, −2.5, −1.5, −0.5, 0.5, 1.5, 2.5, 3.5, 4.5, 5.5, 6.5, and 7.5 counterclockwise from top.

The encryption processing device 1 implements multiplication between Integer-wise type TLWE ciphertexts in the following manner.

$$-\sum_{j=1}^{p} b_j \times KS1_{n+1,j} - \sum_{i=1}^{n}\sum_{j=1}^{p} a_{i,j} \times KS1_{i,j} = -\sum_{j=1}^{p} b_j \times \text{TRLWE\_Enc}_{s'}\left(f'^{(-2^{-j})}\right) - \sum_{i=1}^{n}\sum_{j=1}^{p} a_{i,j} \times \text{TRLWE\_Enc}_{s'}\left(f'^{(2^{-j}\times s_i)}\right)$$

$$= \text{TRLWE\_Enc}_{s'}\left(f'^{\left(\sum_{j=1}^{p} b_j \times 2^{-j}\right)}\right) - \text{TRLWE\_Enc}_{s'}\left(f'^{\left(\sum_{i=1}^{n}\sum_{j=1}^{p} a_{i,j} \times 2^{-j} \times s_i\right)}\right)$$

$$\approx \text{TRLWE\_Enc}_{s'}\left(f'^{(b)}\right) - \text{TRLWE\_Enc}_{s'}\left(f'^{\left(\sum_{i=1}^{n} a_i \times s_i\right)}\right)$$

$$= \text{TRLWE\_Enc}_{s'}\left(f'^{\left(b - \sum_{i=1}^{n} a_i \times s_i\right)}\right)$$

$$= \text{TRLWE\_Enc}_{s'}(f'(\text{TLWE\_Dec}_s(c)))$$

The encryption processing device 1 performs BlindRotate using a stepped polynomial and also performs multiplication between Integer-wise type ciphertexts at the same time.

In the present embodiment, Private Key Switching described in the aforementioned paper (Non-Patent Literature 1) is used as an example for obtaining a stepped polynomial from a ciphertext that is a multiplier. First, Private Key Switching is described.

A key switching key used in Private Key Switching is described as a key switching key KS1 in order to be distinguished from the key switching key KS used in Public Key Switching.

The result of execution of Private Key Switching using the key switching key KS1 can be defined as f(c)= TRLWE_Enc(f'(TLWE_Dec(c)).

That is, a function f that can calculate a ciphertext that can be obtained by applying a function f' to a plaintext obtained by decryption of the TLWE ciphertext c by the encryption processing device 1 and performing processing of TRLWE encryption, without decryption is Private Key Switching performed using the key switching key KS1. Use of the key switching key KS1 enables a TRLWE ciphertext to be obtained from a TLWE ciphertext.

A person who creates the key switching key KS1 knows the private keys [s] and [s'], and thus the person can generate the following key switching key KS1.

$KS1_{i,j} = \text{TRLWE\_Enc}_{s'}(f'(2^{-j} \times s_i))$ $KS1_{n+1,j} = \text{TRLWE\_Enc}_{s'}(f'(-2^{-j}))$ The person who performs Private Key Switching, for example, the encryption processing device 1 can perform the following calculation from a TLWE ciphertext c([a], b) by using the key switching key KS1, even if the person does not know the private keys [s] and [s'].

Since the key switching key KS1 is essentially a set of TRLWE ciphertexts, the private keys [s] and [s'] cannot be obtained from the key switching key KS1.

Similarly to the case of Public Key Switching described above, the encryption processing device 1 decomposes the elements of the TLWE ciphertext as follows.

$a_i \approx \sum_{j=1}^{p} a_{i,j} \times 2^{-j}$ $b_i \approx \sum_{j=1}^{p} b_j \times 2^{-j}$ In the above expressions, $a_{i,j}$ and $b_j$ are values of respective digits when $a_i$ or b is expressed in binary, and can be 0 or 1.

The encryption processing device 1 then calculates $-\sum_{j=1}^{p} b_j \times KS1_{n+1,j} - \sum_{j=1}^{n}\sum_{j=1}^{p} a_{i,j} \times KS1_{i,j}$ In order to check what is calculated without a private key, when this expression is deformed, the following is obtained.

From the above operation result, the TRLWE ciphertext c' of which the plaintext is the result of substitution of the plaintext of the TLWE ciphertext into f' is obtained without decrypting the initial TLWE ciphertext c. The function f' needs to be a function that causes no problem even if the order of the encryption/decryption processing and the processing of evaluating the function f' is switched. In terms of obtaining a ciphertext as the result of evaluation of any function without decrypting a TLWE ciphertext, similar processing is possible in Bootstrapping and Public Key Switching.

In the present embodiment, a function that obtains the following stepped polynomial is set as f'(x), and the key switching key KS1 is calculated in advance.

$f'(x) = x \sum_{i=0}^{t-1}(2i+1)(\sum_{j=0}^{n/t-1} X_{n/ti+j})$

The description returns to the description of the method of multiplying ciphertexts.

The encryption processing device 1 sets a system parameter in TFHE. At this time, the encryption processing device 1 sets the system parameter in such a manner that a range of an error added to a plaintext is less than $\pm 1/(8t^2)$ in a ciphertext obtained after Gate Bootstrapping.

It is assumed that there are a TLWE ciphertext ca as a multiplicand and a TLWE ciphertext cb as a multiplier.

The TLWE ciphertexts ca and cb as the multiplicand and the multiplier are TLWE ciphertexts having the configuration illustrated in FIG. 6A, and each divide the right half plane into t and the entire circle group {T} into 2t.

In the present embodiment, in each of the TLWE ciphertexts ca and cb, the right half plane of the circle group {T} is associated with plaintexts that are non-negative integers, and the left half plane is associated with plaintexts that are negative integers.

The TLWE ciphertext ca has a real number a/(2t)+1/(4t) corresponding to an integer a that cannot be known without a private key, as the plaintext.

The TLWE ciphertext cb has a real number b/(2t)+1/(4t) corresponding to an integer b that cannot be known without a private key, as the plaintext.

The fact that the plaintexts of the TLWE ciphertexts ca and cb are a/(2t) and b/(2t), respectively is based on that the entire circle group is divided into 2t. As described above, the offset of +1/(4t) added to the plaintext associates the slice starting from 0 on the circle group with the integer 0 and also locates the plaintext at the center of the slice.

Since multiplication is commutative, the multiplier and the multiplicand, i.e., the plaintext integers a and b and the TLWE ciphertexts ca and cb can be interchanged.

As described for FIG. 6A, the offset is added to the plaintext in each of the TLWE ciphertext ca and the TLWE ciphertext cb as represented by a/(2t)+1/(4t) and b/(2t)+1/(4t).

As a result of multiplication between the ciphertexts in each of which the offset is added to the plaintext, an offset corresponding to the product of the offsets is added to a plaintext of the multiplication result. This offset component is eliminated in an operation performed later, and therefore does not affect the operation result (the multiplication result).

The value of the offset 1/(4t) is merely an example and is not limited thereto. In accordance with the value of the offset, it is necessary to adjust a polynomial and parameters.

In FIG. 6A, on the left half plane of the circle group {T}, which handles negative numbers, the integers −t to −1 are expressed by using the slice starting from −t/(2t) to the slice starting from −1/(2t) counterclockwise from top.

On the right half plane of the circle group {T}, which handles 0 and positive numbers (non-negative numbers), the integers 0 to t−1 are expressed by using the slice starting from 0/(2t) to the slice starting from t−1/(2t) counterclockwise from bottom.

[Pre-Processing]

The encryption processing device 1 performs the following pre-processing prior to multiplication between ciphertexts, which inverts a value on the left half plane of the circle group {T} handling negative numbers, for each of the TLWE ciphertext ca as a multiplicand and the TLWE ciphertext cb as a multiplier.

FIG. 7 illustrates a circle group associated with TLWE ciphertext ca1 and cb1 after pre-processing.

In the pre-processing, the encryption processing device 1 performs, for each of the TLWE ciphertext ca and the TLWE ciphertext cb, the fifth Gate Bootstrapping and the sixth Gate Bootstrapping by using a stepped univariate polynomial function (a univariate function) $f_{id}$.

$$f_{id}(X) = \sum_{k=0}^{t-1}\left(\frac{k}{2t} + \frac{1}{4t}\right)\sum_{l=0}^{n/t-1} X^{\frac{n}{t}k+1}$$

Gate Bootstrapping Includes BlindRotate, SampleExtract, and Public Key Switching.

For performing an operation of a univariate function for an encrypted integer value, a scheme can be used which is obtained by extending Gate Bootstrapping presented in the aforementioned paper (Non-Patent Literature 1). This scheme is described in "Bootstrapping in FHEW-like Cryptosystems, Daniele Micciancio and Yuriy Polyakov Duality Technologies Feb. 23, 2020". The disclosed scheme does not set a certain constant as a coefficient of a test vector, but sets the result of the function, thereby obtaining different results depending on the value of a TLWE ciphertext.

For input of a ciphertext of a non-negative integer from 0 to t−1, the univariate function $f_{id}$ outputs a ciphertext of the same non-negative integer from 0 to t−1 and adds an offset of 0.5 to the plaintext integer at the same time. For input of a ciphertext of a negative integer from −t to −1, the univariate function $f_{id}$ outputs a ciphertext of an integer from −1 to −t and adds the offset of 0.5 to the plaintext integer at the same time.

As illustrated in FIGS. 6A and 6B, in the TLWE ciphertext ca and the TLWE ciphertext cb, the width of a slice with which one integer is associated is 1/(2t), and adding the offset of 0.5 to the plaintext integer is adding an offset of 1/(4t) to a real number a/(2t) or the like of the plaintext. The representation in which the offset portion of +1/(4t) for the plaintext is included in the integer representation is +0.5.

In a case where there is a plaintext on the right half plane of the circle group {T} in FIG. 6A, the plaintext integer of each of the new TLWE ciphertexts ca1 and cb1 remains within the same slice (region) of the circle group {T} as a result of the above-described pre-processing using the univariate function $f_{id}$, as illustrated in FIG. 7. Meanwhile, in a case where there is a plaintext on the left half plane of the circle group {T}, the plaintext integer of each of the new TLWE ciphertexts ca1 and cb1 is inverted in the circle group {T} as a result of the above-described pre-processing, as illustrated in FIG. 7.

That is, on the right half plane in FIG. 7, integers from 0 to t−1 are assigned to slices from 0/(2t) to 7/(2t) counterclockwise from bottom, and the arrangement of the plaintext integers is not changed from that in FIG. 6A.

Meanwhile, on the left half plane, integers from −1 to −t are assigned to slices from −t/(2t) to −1/(2t) counterclockwise from top, and the arrangement is reversed from that in FIG. 6A.

In FIG. 7 after the pre-processing, integers are −1, −2, −3, −4, −5, −6, −7, −8, 0, 1, 2, 3, 4, 5, 6, and 7 from top of the circle group {T}. Positive and negative values are successively arranged on the circle group {T}.

In FIG. 6A, in a case where the TLWE ciphertext ca is a ciphertext of −1, for example, its plaintext exists in the section from −1/(2t) to 0 on the circle group {T}.

As a result of the above-described pre-processing, in the TLWE ciphertext ca1, the highest block term of the univariate function $f_{id}$ appears as the lowest term with the sign reversed. Therefore, in FIG. 7, the plaintext of the TLWE ciphertext ca1 is −½+1/(4t) as a value on the circle group {T}. Although this plaintext is associated with the integer −t (=−8) in FIG. 6A, −1 is assigned as the plaintext integer in FIG. 7 after the pre-processing.

In FIG. 6A, in a case where the TLWE ciphertext ca is a ciphertext of −t, for example, its plaintext is distributed around −t/(2t)+1/(4t) (that is, is slightly larger than −½) on the circle group {T}, and therefore the plaintext is in the closest section to −½ on the circle group {T}.

As a result of the above-described pre-processing, in the TLWE ciphertext ca1, the lowest block term of the univariate function $f_{id}$ appears with the sign reversed. Therefore, in FIG. 7, the plaintext of the TLWE ciphertext ca1 is −1/(2t)+1/(4t) as a value on the circle group {T}. Although this plaintext is associated with the integer −1 in FIG. 6A, −t (=−8) is assigned as the plaintext integer in FIG. 7 after the pre-processing.

When the above description is generalized, the plaintext of the TLWE ciphertext ca of which the plaintext is a non-negative number becomes a/(2t)+1/(4t) in the TLWE ciphertext ca1 after the pre-processing, and the plaintext integer remains a.

Meanwhile, the plaintext of the TLWE ciphertext ca of which the plaintext is a negative number becomes −(t+1+a)/(2t)+1/(4t) in the TLWE ciphertext ca1 after the pre-processing.

This is also apparent from the following results: when attention is paid only to a numerator of a plaintext, −(t+1+a)=−{t+1+(−1)}=−t in a case where the plaintext integer a is −1; and −(t+1+a)=−{t+1+(−t)}=−1 in a case where the plaintext integer a is −t. This description is also applied to the TLWE ciphertext cb.

As described above, when a plaintext is a non-negative number, a plaintext to which an integer is assigned is changed by pre-processing. However, an integer before the pre-processing is assigned to the plaintext after the pre-processing. Consequently, the arrangement itself of plaintexts on a circle group is not changed as a result of the pre-processing between FIGS. 6A and 7, but the arrangement of plaintext integers to be assigned to the plaintexts is reversed on the left half plane to which negative numbers are assigned.

Since the above-described offset of 0.5 has been added in the plaintexts of the ciphertext in FIG. 7 in which t=8 (2t=16), the plaintexts located at the center of the respective slices are −7.5/(2t), −6.5/(2t), −5.5/(2t), −4.5/(2t), −3.5/(2t), −2.5/(2t), −1.5/(2t), −0.5/(2t), 0.5/(2t), 1.5/(2t), 2.5/(2t), 3.5/(2t), 4.5/(2t), 5.5/(2t), 6.5/(2t), and 7.5/(2t) rotating left (counterclockwise) from top.

To these slices, −1, −2, −3, −4, −5, −6, −7, −8, 0, 1, 2, 3, 4, 5, 6, and 7 are assigned counterclockwise from top of the circle group {T}. Integers represented with the offset of 0.5 included are −0.5, −1.5, −2.5, −3.5, −4.5, −5.5, −6.5, −7.5, 0.5, 1.5, 2.5, 3.5, 4.5, 5.5, 6.5, and 7.5 from top of the circle group {T}.

Since a numerator of a plaintext does not become an integer if the number of divisions remains 2t, the number of divisions is doubled, i.e., set to 4t, in particular, for the TLWE ciphertext cb as a multiplier. Plaintexts in that case are −15/(4t), −13/(4t), −11/(4t), −9/(4t), −7/(4t), −5/(4t), −3/(4t), −1/(4t), 1/(4t), 3/(4t), 5/(4t), 7/(4t), 9/(4t), 11/(4t), 13/(4t), and 15/(4t).

After this process, the encryption processing device 1 uses the new TLWE ciphertext ca1 and the TLWE ciphertext cb1 after Gate Bootstrapping (after the pre-processing).

(1) After the above-described pre-processing, the encryption processing device 1 (the first Bootstrapping unit 16)) performs, as the first Bootstrapping, BlindRotate for the TLWE ciphertext cb1 as a multiplier by using a test vector polynomial TX(X)

$$T(X) = \sum_{k=0}^{t-1} \left( \frac{k}{4t^2} + \frac{1}{8t^2} \right) \sum_{l=0}^{n/t-1} X^{\frac{n}{t}k+1}$$

and further subtracts a trivial ciphertext (0, ⅛t²) to obtain a TLWE ciphertext cb' (LEVEL1).

For the new TLWE ciphertext cb1 after the pre-processing, the number of divisions has been 2t as illustrated in FIG. 7. The first Bootstrapping is performed for dividing the circle group into 4t² by BlindRotate to set a denominator of a plaintext to 4t².

In the present embodiment, the result of multiplication between ciphertexts for which the entire circle group {T} is divided into 2t is recorded in one TLWE ciphertext cc1 in the middle of calculation of multiplication, as described later. The TLWE ciphertext cc1 divides the entire circle group into 4t².

The number of divisions is double the number of divisions (2t²) of the TLWE ciphertext cc' that is the result of multiplication.

By making the number of divisions of the TLWE ciphertext cb' 4t², it is not necessary to change the scale when the TLWE ciphertext cb' is subtracted from the TLWE ciphertext cc1 to obtain the TLWE ciphertext cc' as the multiplication result, as described later.

This conversion of the number of divisions also has an effect of doubling the scale of the coefficient part of the polynomial f'(X) to, for example, 2i+1 when constructing the key switching key KS1, and canceling addition of the offset of +0.5 converted to an integer of +1.

Although the TLWE ciphertext cb1 expresses plaintext integers from −t to t−1 by using the entire circle group {T} associated with −0.5 to 0.5 in FIG. 7, the TLWE ciphertext cb' illustrated in FIG. 8 uses a range from about −1/(4t) to 1/(4t) near 0 as a result of BlindRotate.

More specifically, when t=8, the circle group {T} is divided into 2t=16 for the TLWE ciphertext cb1 in FIG. 7 after the pre-processing, and is divided into 4t²=256 for the TLWE ciphertext cb' in FIG. 8. Therefore, the plaintext expressed by using the entire circle group {T} for the TLWE ciphertext cb is expressed in a range of 1/16 on the circle group for the TLWE ciphertext cb'.

This range corresponds to the range of about −1/(4t) to 1/(4t) near 0 equivalent to one slice on the circle group for the TLWE ciphertext cb.

In FIG. 8, the sections from 1/(4t) to 0.5 and from 0.5 to −1/(4t) are unused (unassigned). Then, −t/4t² to (t−1)/4t² are assigned to a region near 0 with fineness of 4t²=256 divisions. These slices correspond to integers −8, −7, −6, −5, −4, −3, −2, −1, 0, 1, 2, 3, 4, 5, 6, and 7.

In a case where the plaintext integer b is a negative integer, −1 to −t (the left half plane) is inverted in FIG. 7 from the state in FIG. 6A by the above-described pre-processing.

When Bootstrapping for dividing the circle group into 4t² to make the denominator of the plaintext 4t² in (1) is performed for the TLWE ciphertext cb1 after the pre-processing, the plaintext of the TLWE ciphertext cb' after Bootstrapping becomes b/(4t²) irrespective of whether the plaintext integer b is positive or negative.

A case where the plaintext b before the pre-processing is negative is considered. When b is −1, the plaintext b after the pre-processing becomes −t, and the lowest block becomes −1/(8t²) with the sign reversed as a result of the first Bootstrapping. Thereafter, subtraction of a trivial ciphertext (0, ⅛t²) is performed, so that −1/(4t²)=b/(4t²).

When b is −t, the plaintext b after the pre-processing becomes −1, and the highest block becomes −(t−1)/(4t²)−1/(8t²) with the sign reversed as a result of the first Bootstrapping. Thereafter, when the trivial ciphertext (0, ⅛t²) is subtracted, so that −t/(4t²)=b/(4t²).

With the processing in (1), the TLWE ciphertext cb' for which the circle group is converted into 4t² divisions is obtained from the TLWE ciphertext cb1.

Regarding a ciphertext that is a multiplier, the plaintext integer that is a negative number inverted by the pre-processing is reversed again as a result of the first Bootstrapping in (1). Negative numbers are assigned to the left half plane in the order of −8, −7, −6, −5, −4, −3, −2, and −1 from top.

Further, although the test vector includes the offset (⅛t²) added thereto, this offset is eliminated by homomorphic subtraction of a trivial ciphertext (0, ⅛t²) after the first Bootstrapping. Therefore, for the ciphertext cb' illustrated in FIG. 8, the manner of division without offset (plaintexts are distributed in a range of 0±⅛t²) is adopted.

(2) The encryption processing device 1 (the key exchange unit 30) performs Private Key Switching with the key switching key KS1 prepared in advance, for the TLWE ciphertext cb' to obtain a TRLWE ciphertext cc having a stepped polynomial as the plaintext. The private key of the obtained TRLWE ciphertext cc is [s'].

When the TRLWE ciphertext cc is decrypted with the private key [s'], $$\varphi_{s'}(cc) = f'(\varphi_s(cb')) =$$

$$\varphi_s(cb')\sum_{i=0}^{t-1}(2i+1)\left(\sum_{j=0}^{n/t-1} X^{\frac{n}{t}i+j}\right) = \frac{b}{4t^2}\sum_{i=0}^{t-1}(2i+1)\left(\sum_{j=0}^{n/t-1} X^{\frac{n}{t}i+j}\right)$$

is obtained. Therefore, the plaintext of the TRLWE ciphertext cc is a stepped plaintext polynomial $$\frac{b}{4t^2}\sum_{i=0}^{t-1}(2i+1)\left(\sum_{j=0}^{n/t-1} X^{\frac{n}{t}i+j}\right)$$

and a polynomial is obtained as a result, for which the right half plane of the circle group is divided into t (0, 1, 2, 3, ... ), and the left half plane is divided into t (−1, −2, −3, ... ) and in which coefficients increase by the value of the plaintext b of the TLWE ciphertext cb in a stepwise manner.

When the TLWE ciphertext cb has 3 as a plaintext, a plaintext polynomial is obtained as a result of Private Key Switching, in which 1.5, 4.5, 7.5, 10.5, and 13.5 obtained by adding an offset of 1.5, which is a half value of b, to 0, 3, 6, 9, and 12, which are multiples of 3 as the plaintext of the TLWE ciphertext cb, are arranged as coefficients of terms of the respective orders corresponding to the right half plane of the circle group.

This polynomial is derived from the function $$f'(x) = x\sum_{i=0}^{t-1}(2i+1)\left(\sum_{j=0}^{n/t-1} X^{\frac{n}{t}i+j}\right)$$

for obtaining the above-described key switching key KS1.

In association with addition of the offset of 0.5 to the plaintext in $f_{id}$ in the pre-processing, the offset of 0.5 is added to the plaintext also in a plaintext polynomial (the key switching key KS1) of the TRLWE ciphertext cc. The offset of 0.5 (½) is derived from i+(½) obtained by dividing 2i+1 in the key switching key KS1 by 2. More appropriately, the scale of the coefficient part i+(½) including the offset of +0.5 is doubled, so that addition of the offset is converted to addition of an integer of +1.

Since the TLWE ciphertext cb' is $b/(4t^2)$ irrespective of whether the plaintext integer b of the original TLWE ciphertext cb1 is positive or negative as described in (1), all the terms of the plaintext polynomial of the TLWE ciphertext cc are negative when b is negative, and the coefficients thereof decrease by b as opposed to a case where b is positive.

(3) The encryption processing device 1 (the second Bootstrapping unit 17) performs the second Bootstrapping. The encryption processing device 1 performs BlindRotate using the TLWE ciphertext ca (LEVEL0) for the TRLWE ciphertext cc (LEVEL1) and then performs SampleExtract, thereby obtaining the TLWE ciphertext cc1 (LEVEL1). The private key of the TLWE ciphertext cc1 that is a LEVEL1 ciphertext is [s'].

(i) When the plaintext integer a is not a negative integer (0 or positive), the TLWE ciphertext ca' obtained by multiplying the TLWE ciphertext ca by 2n has (an)/t+n/(2t) as the plaintext from $\varphi_s(ca')=(an)/t+n/(2t)$.

Therefore, the term of the plaintext polynomial of $\varphi_{s'}(cc)$, of which the power is close to (an)/t+n/(2t), is obtained as a constant term. This is a coefficient of the term for which i=a in the above-described plaintext polynomial.

Thus, $\varphi_s(cc1)=(2a+1)b/(4t^2)$ is established, and the TLWE ciphertext cc1 has $(2a+1)b/(4t^2)$ as the plaintext.

The TLWE ciphertext cc1 is a ciphertext corresponding to the product of the plaintext integer a and the plaintext integer b, and the product of the plaintext integer a and the plaintext integer b has been obtained in this stage.

Specifically, as a result of the second Bootstrapping, 1.5, 4.5, 7.5, 10.5, and 13.5 obtained by adding 1.5, that is a half of each of multiples of 3 based on the plaintext polynomial of the TLWE ciphertext cb' to the each multiple are arranged. Since the (a+1)th (because a includes 0) value among them, where a is the plaintext integer of ca, is obtained, the third value, i.e., 7.5 is obtained as the TLWE ciphertext cc' when the plaintext polynomial a of ca is 2. Actually, a value of 2.5×3=7.5 is obtained as a solution of (a+0.5)×b, and multiplication is correctly performed. The offset of 0.5 added to a will be removed later.

(ii) When the plaintext integer a is a negative integer, only the left half plane for the TLWE ciphertext ca is inverted as a result of the pre-processing, so that the TLWE ciphertext ca has −(t+1+a)/(2t)+1/(4t) as the plaintext. Therefore, the TLWE ciphertext ca' obtained by multiplying the TLWE ciphertext ca1 after the pre-processing by 2n has −n−{(a+1)}n/t+n/(2t) as the plaintext from $\varphi_s(ca')=\{-(t+1+a)\}n/t+n/(2t)=-n-\{(a+1)\}n/t+n/(2t)$.

From the property that the residue group $T(X)/(X^n+1)$ of the polynomial is a finite cyclic group, when multiplication by $X^1$ is performed −n times, all the terms become negative. Therefore, it can be interpreted that in BlindRotate, the signs of all the coefficients of the plaintext polynomial of the TLWE ciphertext cc1 are reversed, and then multiplication by $X^1$ is performed $\varphi_s(ca')+n=-\{(a+1)\}n/t+n/(2t)$ times.

That is, in the plaintext polynomial after BlindRotate, the term of which the power is close to {−(a+1)n}/t+n/(2t) is obtained as a constant term. That is, this is a negative number of a coefficient of the term for which i=−(a+1) in the above-described plaintext polynomial. Therefore, $\varphi_{s'}(cc1)=-\{-2(a+1)+1\}b/(4t^2)=-(-2a-1)b/(4t^2)=(2a+1)b/(4t^2)$. Thus, the same expression as that in a case where the plaintext is a positive integer is obtained. As described above, the TLWE ciphertext cc1 is a ciphertext corresponding to the product of the plaintext integer a and the plaintext integer b.

This is an effect obtained by adding the term of +½ to the polynomial of f used in calculation of the key switching key KS1.

In a case where the term of +½ is not added, $ab/(2t^2)$ is obtained when the plaintext integer a is a positive integer, and $(a+1)b/(2t^2)$ is obtained when the plaintext integer a is a negative integer (including 0). The result when a=0 and the result when a=−1 (the plaintext integer a is a negative integer) are the same as each other, and therefore it cannot be determined whether a is 0 or -1 originally if the sign is not separated for a and b.

As for the pre-processing for the TLWE ciphertext cb and the processing in (1), Bootstrapping performed twice is equivalent to calculation of the linear function g(X)=1/(2t)×x.

The paper "Bootstrapping in FHEW-like Cryptosystems, Daniele Micciancio and Yuriy Polyakov Duality Technologies Feb. 23, 2020" described above introduces a scheme of evaluating any function satisfying a specific condition. In the present embodiment, by using Bootstrapping performed twice, such as those in the pre-processing for the TLWE ciphertext cb and in (1), any odd function other than a linear function can be evaluated for both positive and negative ranges without a specific condition.

Here, since a TLWE ciphertext (dividing the entire circle group into $4t^2$) of a constant term can be obtained by SampleExtract, the TLWE ciphertext cb' is subtracted from the TLWE ciphertext cc1 in order to eliminate the term of ½, so that the TLWE ciphertext cc' is obtained.

Here, in order to calculate ½, the TLWE ciphertext cb' is made half in advance when being calculated, and the magnitude of the key switching key KS1 is doubled. The numerator of the key switching key KS1 can thus be made an integer.

From $\varphi_s(cc')-\varphi_s(cc1)-cb'=(2a+1)b/(4t^2)-b/(4t^2)=ab/2t^2$, the TLWE ciphertext cc' has $ab/2t^2$ as the plaintext.

Thus, the TLWE ciphertext cc' (LEVEL1) corresponding to the product of a and b is obtained. The TLWE ciphertext cc' is a ciphertext dividing the circle group $\{T\}$ into $2t^2$, as illustrated in FIG. 9.

Figure 9:
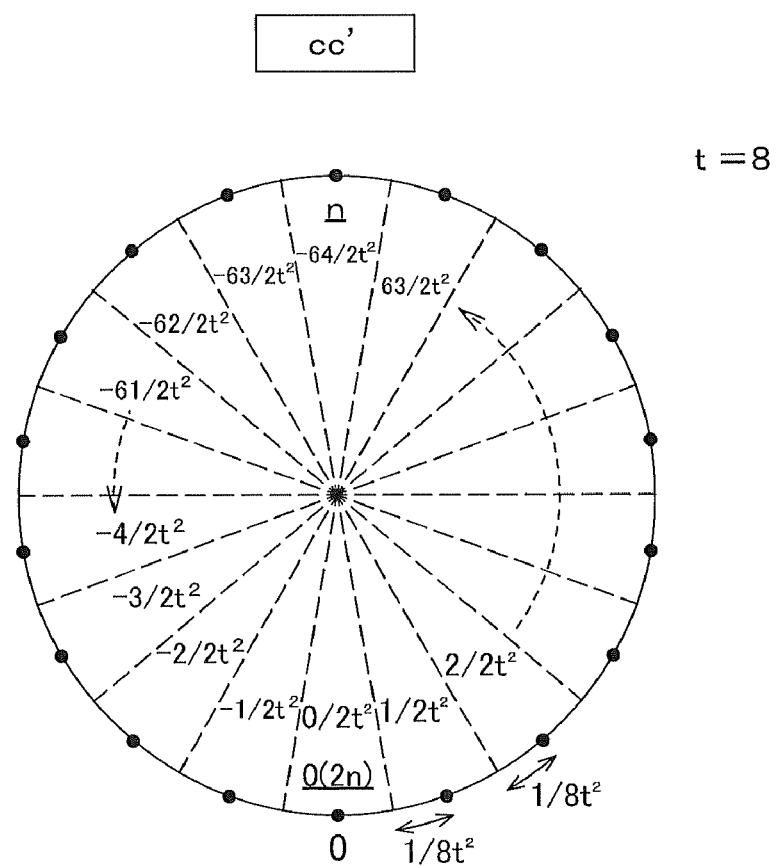
FIG. 9 is an explanatory diagram of Integer-wise type TFHE in the present embodiment.

The TLWE ciphertext cc' as the multiplication result illustrated in FIG. 9 divides each of the left half and the right half plane of the circle group $\{T\}$ into $t^2$, thereby dividing the entire circle group into $2t^2$.

$2t^2-1$ is the maximum value the TLWE ciphertext can have as a multiplication result obtained in the middle.

When t=8, the right half plane of the circle group is divided into $t^2=64$, so that the right half plane of the circle group $\{T\}$ can express $t^2=64$ integers 0, 1, 2, 3, 4, 5, 6, 7, . . . , and 63. The left half plane of the circle group $\{T\}$ can express $t^2=64$ integers −64, −63, −62, . . . , and −1.

The entire range of the circle group $\{T\}$ from 0 to 1 is divided into $2t^2=128$, and the ciphertext can express integers of −64, −63, . . . , −4, −3, −2, −1, 0, 1, 2, 3, 4, . . . , 62, and 63.

These integer values are assigned to sections with a width of $½t^2$ obtained by dividing the entire range of the circle group from 0 to 1 into $2t^2$.

When t=8, 23=8, and therefore the TLWE ciphertexts ca and cb as a multiplier and a multiplicand each record a 3-bit integer on the circle group (the right half plane). The result of multiplication between 3-bit integers is a 6-bit integer, and a TLWE ciphertext recording this result divides the circle group (the right half plane) into $2^6=64$, i.e., $t^2$.

However, the ciphertext of the multiplication result is different from the ciphertexts as the multiplier and the multiplicand in the number of divisions of the circle group. While the denominator of the plaintexts of the TLWE ciphertexts ca and cb is 2t, the denominator of the plaintext of the TLWE ciphertext cc' is $2t^2$. The number of divisions of the circle group for the ciphertexts is different before and after multiplication.

The TLWE ciphertext cc' cannot be used in, for example, multiplication with a ciphertext in which the denominator of a plaintext is 2t, such as the TLWE ciphertexts ca and cb.

It is necessary to convert the TLWE ciphertext cc' to a ciphertext in which the denominator of a plaintext is 2t (to make the number of divisions of the circle group coincident before and after multiplication between ciphertexts). Accordingly, the encryption processing device 1 performs conversion for that purpose at high speed.

For example, this conversion is to extract the lower 3 bits (t divisions) and the higher 3 bits (t divisions) from the 6-bit multiplication result ($t^2$ divisions) and to obtain a ciphertext in t divisions that is the same as that before multiplication.

The denominator of the plaintext of the ciphertext by which the TLWE ciphertext cc' is multiplied may be set to $2t^2$. However, in this case, as the number of times of multiplication increases, the number of divisions of the circle group increases, and the acceptable error range becomes smaller.

Therefore, applying this setting to a complicated configuration is not preferable. Meanwhile, such a configuration is called Leveled-FHE and causes no problem even when being used as it is for some usages, for example, in a case where only one convolution (dot product) operation is enough.

In the present embodiment, in order to perform conversion for making the number of divisions of the circle group coincident before and after multiplication between ciphertexts at high speed, lower 3 bits (2t divisions) and higher 3 bits (2t divisions) are extracted from, for example, a 6-bit multiplication result ($2t^2$ divisions), so that a ciphertext in 2t divisions that is the same as that before multiplication is obtained.

Further, since the multiplication result easily exceeds t, the multiplication result is decomposed into a quotient and a remainder obtained by dividing the multiplication result by t. The quotient is the higher 3 bits, and the remainder is the lower 3 bits.

For example, when t=8, the quotient and the remainder when the multiplication result is divided by t can be obtained by Bootstrapping by a sawtooth polynomial (coefficients are 0123 . . . 67012 . . . ) and a stepped polynomial (coefficients are 000011112222 . . . ) for 0 to 63 ($8^2=64$). However, since it is considered that the optimum order N of a vector used in TFHE is 635 and the optimum order n of a polynomial is 1024, 635 errors generated in rounding-off are accumulated when the 635 coefficients of a TLWE ciphertext is multiplied by 2n immediately before BlindRotate. Further, a section obtained by dividing the order n of the polynomial in accordance with the number of divisions of the section from 0 to 0.5 is a section corresponding to one integer. However, in a case of 64 divisions, each section has a width of 16 only, and therefore an acceptable error is only ±8. In this case, a calculation error rate is too high.

There are options to increase the order n of the polynomial or to make the order N of the vector smaller. However, in either case, the encryption strength or the calculation speed is sacrificed. When the order of the polynomial is increased, the calculation amount of multiplication performed in CMux is increased by $O(n^2)$, whereas when the order of the vector is made smaller, the flexibility of analysis is reduced, enabling encryption to be easily deciphered.

Accordingly, in the present embodiment, calculation of a ciphertext in which the denominator of a plaintext is 2t (a ciphertext of a quotient and a ciphertext of a remainder) from the denominator of the plaintext of $2t^2$ is performed, while the error rate is sufficiently reduced by the following method.

(4) The encryption processing device 1 (the third Bootstrapping unit 18) multiplies the TLWE ciphertext cc' by t, performs Public Key Switching to lower the level to LEVEL0, adds a trivial ciphertext (0,1/(4t)), and thereafter performs BlindRotate by a test vector polynomial with µ=¼ and SampleExtract.

(0,1/(4t)) to be added is an offset for setting the boundary between 0 and −1 to 0 on the circle group $\{T\}$.

When the TLWE ciphertext cc' is multiplied by t, the denominator of the plaintext becomes 2t.

It is desired to use the section from 0 to 0.5 on the circle group {T} as the lower bits of the multiplication result. This is because the lower bits are always positive. However, when this operation is actually performed, the plaintexts are also distributed in the section from 0.5 to 1.

Therefore, after multiplication by t, the TLWE ciphertext cd (LEVEL1) is obtained of which the plaintext is ¼ when the plaintext is in the section from 0 to 0.5, and has −¼ when the plaintext is in the section from 0.5 to 1. The private key of the TLWE ciphertext cd that is a LEVEL1 ciphertext is [s'].

(5) The encryption processing device 1 (the second operation unit 13) calculates cc'×t+cd−(0, ¼)+(0,1/(4t)).

The encryption processing device 1 (the third Bootstrapping unit 18) performs Public Key Switching for the result of that calculation to obtain the TLWE ciphertext cl (LEVEL0) for which the private key is [s]. The lower bits of the multiplication result are thus obtained.

The TLWE ciphertext cl is a ciphertext that becomes $\varphi_s(cl)=(ab \bmod t)/(2t)+1/(4t)$ when being decrypted.

If the higher bits are not necessary, the procedure may be ended at this point.

Considering that the remainder is always positive, the plaintext of the TLWE ciphertext cl is positive even if the plaintext of the TLWE ciphertext cc' is negative. When calculation is performed up to the quotient, t×quotient+remainder=ab is established irrespective of whether the plaintext is positive or negative, so that there is no mathematical contradiction. When the multiplication result is obtained from a state where it is stored in one variable by using a division remainder calculation instruction in a computer, the result is completely coincident with a process of decomposing the multiplication result by a shift operation and an AND operation with t being a power of 2, that is, a process of simply dividing bits in binary notation, although it varies depending on a language processing system and a CPU architecture.

Since the calculation is performed using the TLWE ciphertext multiplied by t, the range of values corresponding to one integer symbol increases t times, and an error due to rounding off can be relatively allowed. In addition, by performing addition and multiplication by the TLWE ciphertexts using the secret key [s'], it is possible to reduce the influence of Public Key Switching that adds a relatively large error.

When the higher bits of the multiplication result are necessary, the following operation is performed.

(6) The encryption processing device 1 (the fourth Bootstrapping unit 19) performs BlindRotate and SampleExtract for the TLWE ciphertext cl of the lower bits by using the test vector polynomial $$T(X) = \sum_{k=0}^{t-1} \frac{k}{2t^2} \sum_{l=0}^{n/t-1} X^{\frac{n}{t}k+1},$$

thereby obtaining the TLWE ciphertext cl' (LEVEL1). The private key of the TLWE ciphertext cl' is [s'].

The TLWE ciphertext cl' is a ciphertext in which the denominator of the plaintext is ½t² and which retains the lower bits (ab mod t) of the multiplication result by using the section from 0 to 1/(2t). Since it is assumed that the remainder is not a negative number, it is considered that only the right half plane of the circle group is used. Thus, whether or not to add an offset to the test vector polynomial does not affect the results.

(7) The encryption processing device 1 calculates cu=cc'−cl'+(0, 1/(4t)) to obtain the TLWE ciphertext cu.

Public Key Switching is performed for the TLWE ciphertext cu, and the private key is returned from [s'] to [s], so that the TLWE ciphertext cu' is obtained. That is, by subtracting (ab mod t)/2t² from ab/2t², the numerator is made a multiple of t, and the numerator and denominator are reduced by t. Then, $$\varphi_s(cu') = ab - (ab \bmod t)/2t^2 + \frac{1}{4t} = \left\lfloor \frac{ab}{t} \right\rfloor /2t + \frac{1}{4t}$$

is obtained.

At this time, since the error components added to the plaintexts of the TLWE ciphertext cc' and the TLWE ciphertext cl' follow the normal distribution, the error added to the plaintext of the TLWE ciphertext cu also follows the normal distribution due to the reproducibility. Therefore, the TLWE ciphertext cu' can be used for the next operation as it is.

That is, by subtracting a ciphertext that is the remainder of 8 from a ciphertext dividing the right half plane into 64, a ciphertext having a multiple of 8 as the plaintext is always obtained. That is, every eight blocks are used. When being compared with a ciphertext dividing the right half plane into eight, this ciphertext can be regarded as being the same in the dividing manner but being different only in the variance of errors applied thereto. Therefore, the TLWE ciphertext cu can be substantially treated as the ciphertext dividing the right half plane into eight.

This is because the error components added to the plaintexts of the TLWE ciphertext cc' and the TLWE ciphertext cl' follow the normal distribution. The error added to the plaintext of the TLWE ciphertext cu obtained by cc'−cl' also follows the normal distribution due to the property called reproducibility. Therefore, the TLWE ciphertext cu' that is the higher digits (bits) of multiplication can be used for the next operation without being subjected to Bootstrapping.

Both the TLWE ciphertext cu' and the TLWE ciphertext cl are at LEVEL0 at which the private key has been returned to [s] by Public Key Switching finally. By eliminating this process and performing Public Key Switching for each of the TLWE ciphertext ca and the TLWE ciphertext cb in pre-processing, LEVEL1 input and output can be realized.

As described above, in the present embodiment, the right half plane of the circle group {T} is used as unsigned integers (0 or positive integers), and the left half plane of the circle group {T} is treated as signed integers (negative integers). By entirely using the circle group {T} that serves as a plaintext space of a TLWE ciphertext, a large amount of information (substantially more than the amount in the second example described below by one bit) can be packed. Thus, it is possible to reduce the amount of computation by targeting a small number of ciphertexts, for example, in a case of forming a multiple-precision integer.

Looping the CMux can substitute for Private Key Switching.

The encryption processing device 1 sets the result of BlindRotate performed for the TLWE ciphertext cb that is the multiplicand (the TLWE ciphertext cb1 after pre-processing), as the TRLWE ciphertext $c_1$. The TRLWE ciphertext $c_1$ has a polynomial as its plaintext.

The encryption processing device 1 multiplies each coefficient of the TLWE ciphertext ca (the TLWE ciphertext ca1 after the pre-processing) by 2t and rounds off, thereby obtaining the TLWE ciphertext ca". Since rounding off is performed after multiplication by 2t, all the elements of the TLWE ciphertext ca" are integers.

At this time, $\varphi_s(ca") = a$ is established, and therefore the plaintext of the TLWE ciphertext ca" is a, that is, the same as the plaintext of the TLWE ciphertext ca.

The TLWE ciphertext ca" is formed by caa and cab, and caa and cab correspond to the above-described elements [a] and b that form the TLWE ciphertext ([a],b), respectively.

The encryption processing device 1 assumes $A_0 = cab \times c_1$, and repeats the following calculation of CMux including multiplication for the TRLWE ciphertext $c_1$, for caa and cab. BK is a Bootstrapping Key.

$$A_i = \mathrm{CMux}(BK_i, -caa_i c_1 + A_{i-1}, A_{i-1})$$

This calculation of CMux is a modification of BlindRotate described regarding the aforementioned paper (modified BlindRotate).

Either of two TRLWE ciphertexts $caa_i \times c_1 + cab \times c_1$ and $cab \times c_1$ is selected in accordance with the value (0 or 1) of $s_i$ based on the Bootstrapping Key.

When $s_i$ is 1, $caa_i \times c_1 + cab \times c_1$ is selected as $A_i$. When $s_i$ is 0, $cab \times c_1$ is selected as $A_i$.

This process is repeated n times. Thus, a new TRLWE ciphertext $A_n$ that has the result of multiplication between plaintext polynomials of the TLWE ciphertext ca" and the ciphertext $c_1$ as its plaintext can be obtained in accordance with the elements of the original TLWE ciphertext ca" and the private key vector in the Bootstrapping Key.

Since the elements caa and cab of the TLWE ciphertext ca" are all integers as described above, multiplication by scalars can be calculated for a circle group that is a coefficient of an element of the TRLWE ciphertext $c_1$. Since the coefficients are circle groups, they can be added.

Performing the above calculation is equivalent to calculating $$A_n = (cab - \Sigma_{i=1}^n caa_i \times s_i) \times c_1 = \varphi_s(ca') \times c_1.$$

That is, the TRLWE ciphertext $c_1$ as a multiplier is multiplied by an integer obtained by decrypting the TLWE ciphertext ca" (dividend), so that a ciphertext of the result of multiplication is obtained.

This multiplication is equivalent to multiplication of a coefficient of a polynomial that is the plaintext of the ciphertext $c_1$ by the plaintext of the TLWE ciphertext ca" that is the multiplicand.

The constant term of the plaintext polynomial of the ciphertext $A_n$ is $ab/2t^2$, and the same ciphertext as the TLWE ciphertext cc' was able to be obtained.

The subsequent processing is the same as the processing after (4) described above, and the encryption processing device 1 performs processing of calculating the TLWE ciphertext cd from the TLWE ciphertext cc' and calculating the TLWE ciphertexts cl, cl', and cu' in turn.

Figure 10:
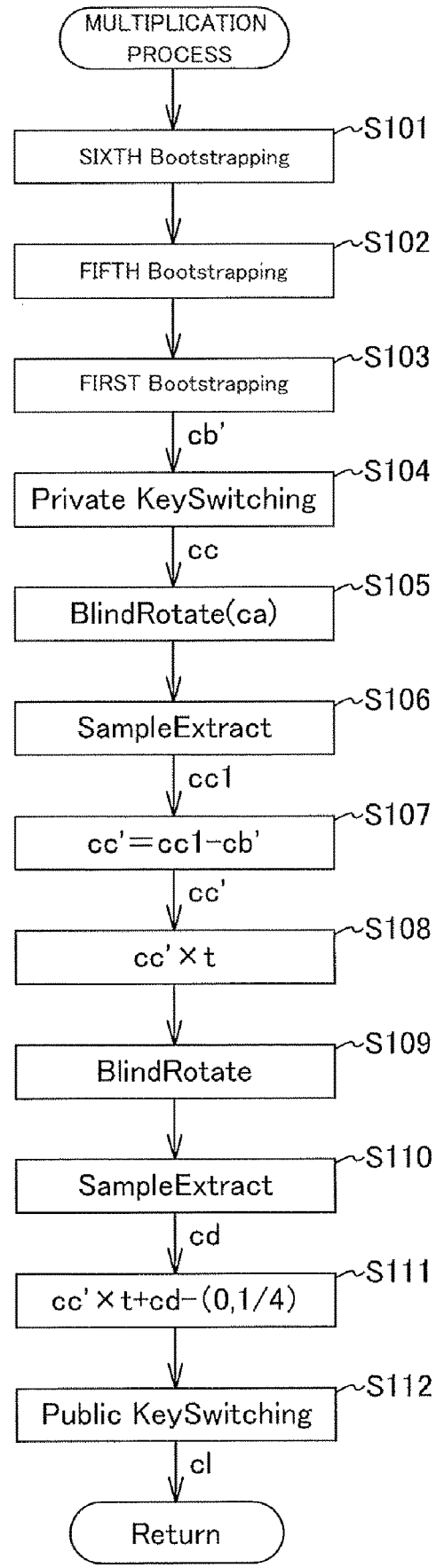
FIG. 10 is a flowchart for explaining a multiplication process in the present embodiment.

FIG. 10 is a flowchart for explaining a multiplication process in the present embodiment.

The encryption processing device 1 (the sixth Bootstrapping unit 22) performs the sixth Bootstrapping using $f_{id}$ for the TLWE ciphertext ca as a multiplier at Step S101 to obtain the new TLWE ciphertext ca1.

The encryption processing device 1 (the fifth Bootstrapping unit 21) performs the fifth Bootstrapping using $F_{id}$ for the TLWE ciphertext cb as a multiplier at Step S102 to obtain the new TLWE ciphertext cb1. Steps S101 and S102 are in no particular order.

The encryption processing device 1 (the first Bootstrapping unit 16) performs the first Bootstrapping for the TLWE ciphertext cb1 as a multiplier at Step S103 to obtain the TLWE ciphertext cb'.

The encryption processing device 1 (the key exchange unit 30) performs Private Key Switching for the TLWE ciphertext cb' to obtain the TRLWE ciphertext cc at Step S104.

The encryption processing device 1 (the second Bootstrapping unit 17) performs BlindRotate using the TLWE ciphertext ca1 for the TRLWE ciphertext cc at Step S105 and performs SampleExtract at Step S106, thereby obtaining the TLWE ciphertext cc1.

The encryption processing device 1 (the fourth operation unit 15) calculates cc1−cb' at Step S107 to obtain the TLWE ciphertext cc'.

The encryption processing device 1 (the first operation unit 12) calculates cc'×t at Step S108.

The encryption processing device 1 (the third Bootstrapping unit 18) performs, for the TLWE ciphertext cc' multiplied by t, BlindRotate at Step S109 and SampleExtract at Step S110 to obtain a TLWE ciphertext cd.

The encryption processing device 1 (the second operation unit 13) calculates cc'×t+cd(0, ¼) at Step S111, and the encryption processing device 1 (the third Bootstrapping unit 18) performs Public Key Switching at Step S112, thereby obtaining the TLWE ciphertext cl.

With the above processes, the lower bits (3 bits) of the result of multiplication between Integer-wise type TLWE ciphertexts can be obtained.

Figure 11:
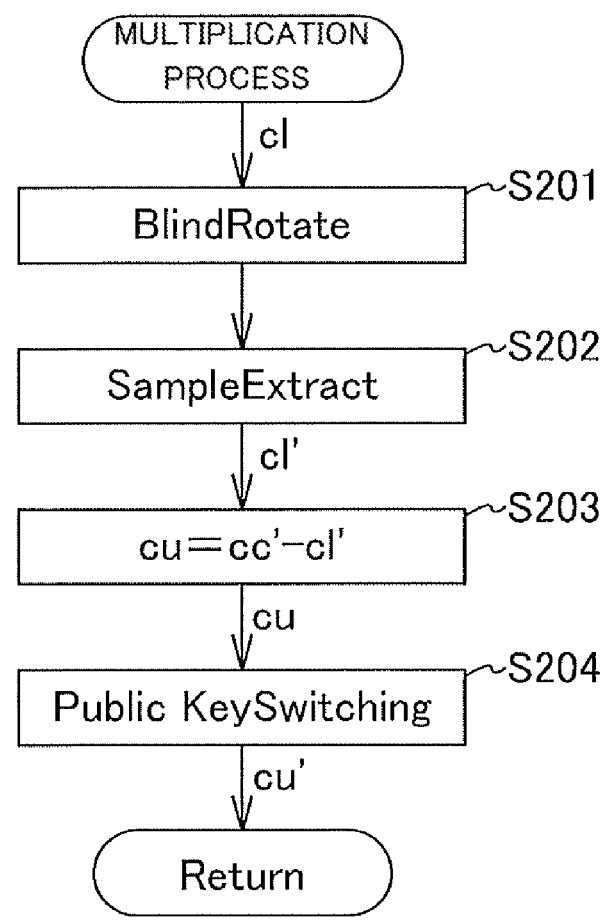
FIG. 11 is a flowchart for explaining the multiplication process in the present embodiment.

FIG. 11 is a flowchart for explaining a multiplication process in the present embodiment.

The encryption processing device 1 (the fourth Bootstrapping unit 19) performs BlindRotate using the TLWE ciphertext ca for the TLWE ciphertext cl at Step S201 and performs SampleExtract at Step S202, thereby obtaining the TLWE ciphertext cl'.

The encryption processing device 1 (the third operation unit 14) calculates cc'−cl' at Step S203 to obtain the TLWE ciphertext cu.

The encryption processing device 1 (the fourth Bootstrapping unit 19) performs Public Key Switching for the TLWE ciphertext cu at Step S204 to obtain the TLWE ciphertext cu'.

With the above processes, the higher bits of the result of multiplication between Integer-wise type TLWE ciphertexts can be obtained.

Second Example

In the second example described below, the TLWE ciphertexts ca and cb as a multiplier and a multiplicand are ciphertexts each having a plaintext illustrated in FIGS. 6A and 6B. However, the ciphertext for which an operation is performed only uses the right half plane of the circle group {T}. Multiplication performed in the following description is multiplication between ciphertexts each having an unsigned (positive) integer as the plaintext.

When it is assumed that only positive integers are used as its plaintext, multiplication can be performed at higher speed with less processing than the above-described signed multiplication.

Also in the second example, the encryption processing device 1 uses Private Key Switching presented in the aforementioned paper (Non-Patent Literature 1) to generate a TRLWE ciphertext having a stepped polynomial as its plaintext from a TLWE ciphertext as a multiplier in the present embodiment. The encryption processing device 1 then implements multiplication by performing BlindRotate by a TLWE ciphertext as a multiplicand for the thus obtained TRLWE ciphertext.

Since the left half plane of the circle group {T} is not used for a negative integer plaintext in the second example, Bootstrapping using the univariate function $f_{id}$ which is pre-processing for inverting the left half plane is not performed. In addition, in a stepped polynomial (the univariate function $f_{id}$ or the key switching key KS1), neither addition of an offset of 0.5 to a plaintext (coefficients of the polynomial) nor final returning of 0.5 is performed.

Figure 12:
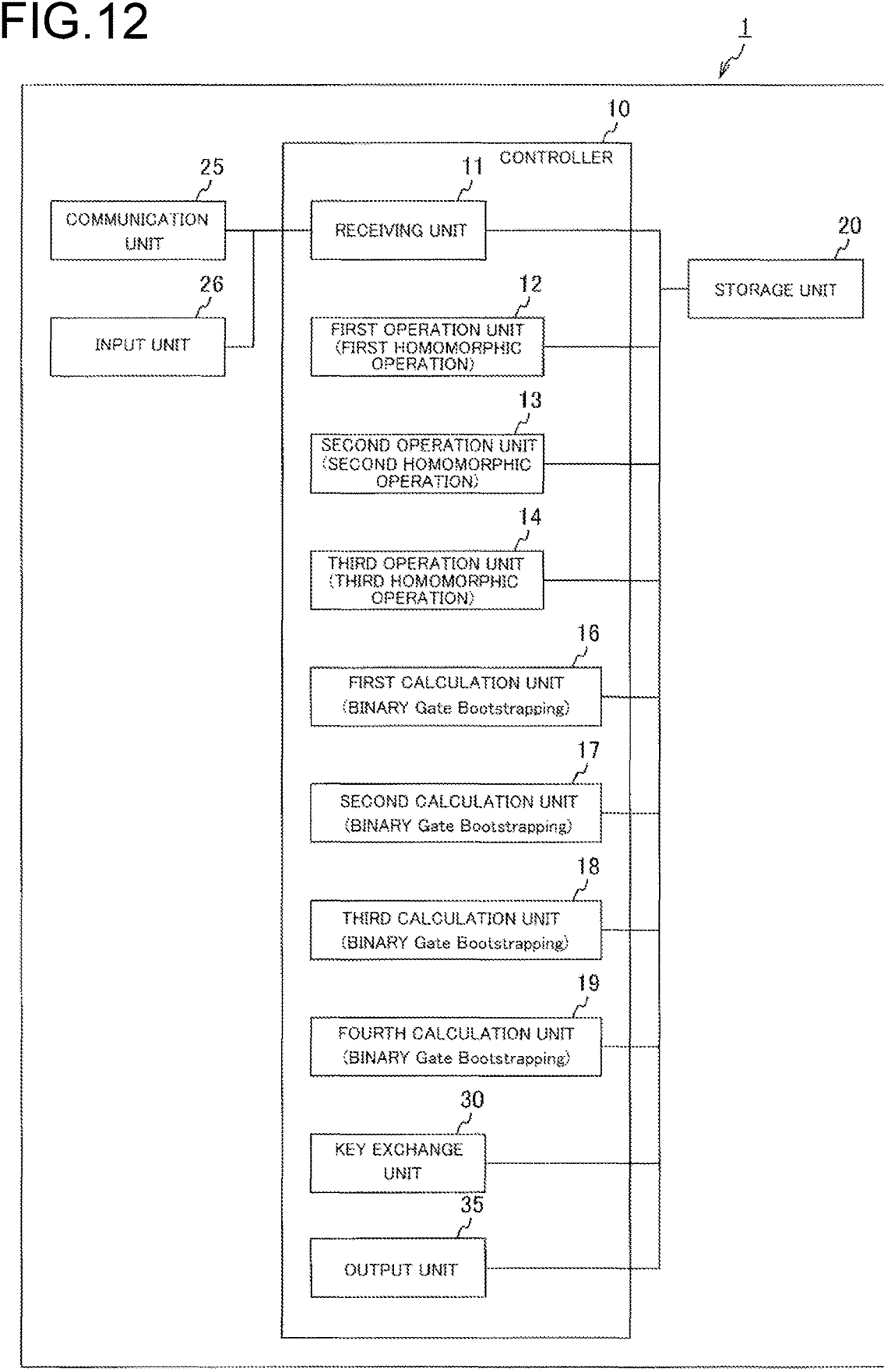
FIG. 12 is an explanatory diagram of a functional configuration of an encryption processing device according to a second example of the present embodiment.

FIG. 12 is an explanatory diagram of a functional configuration of the encryption processing device according to the second example of the present embodiment.

FIGS. 13A and 13B are explanatory diagrams of an operation process based on the functional configuration in FIG. 12.

The second example illustrated in FIGS. 12, 13A, and 13B is different from FIGS. 1, 2A, and 2B in that the fifth calculation unit 21 and the sixth calculation unit 22 that perform pre-processing and the fourth operation unit 15 are not included, and the second calculation unit directly outputs the TLWE ciphertext cc'.

Processes (1) to (7) for performing a multiplication process are described.

(1) The encryption processing device 1 (the first Bootstrapping unit 16) performs Gate Bootstrapping using a test vector polynomial $$T(X) = \sum_{k=0}^{t-1} \frac{k}{2t^2} \sum_{l=0}^{n/t-1} X^{\frac{n}{t}k+1}$$

for the TLWE ciphertext cb to obtain the TLWE ciphertext cb'.

As a result of this Gate Bootstrapping, the denominator of the plaintext of the ciphertext has been changed from 2t to $2t^2$, and the TLWE ciphertext cb dividing the right half plane of a circle group into t=8 has been converted to the TLWE ciphertext cb' dividing the right half plane into $t^2$=64.

The TLWE ciphertext cb is a ciphertext in which integers from 0 to (t−1) are associated with 0 to 0.5 (the right half plane) of the circle group divided by t=8.

At this time, the numerator of the plaintext of the TLWE ciphertext cb' has not been changed from the numerator of the plaintext of the TLWE ciphertext cb. Thus, in the TLWE ciphertext cb', integers from 0 to (t−1) are associated with the lower half plane of 0 to 0.5 (the right half plane) of the circle group divided into $t^2$=64.

The other parameters for the TLWE ciphertext cb and the TLWE ciphertext cb' will be described later. This is because the other parameters are related to level in fact.

(2) The encryption processing device 1 (the key exchange unit 30) performs Private Key Switching for the TLWE ciphertext cb' by using the key switching key KS1 to obtain the TRLWE ciphertext cc. The private key of the ciphertext cc is [s'].

In the second example, a function that obtains the following stepped polynomial is set as f''(x), and the key switching key KS1 is calculated in advance.

$$f'(x) = x \sum_{i=0}^{t-1} i \left( \sum_{j=0}^{n/t-1} X^{\frac{n}{t}i+j} \right)$$

When the TRLWE ciphertext cc is decrypted with the private key [s'], $$\varphi_{s'}(cc) =$$

$$f''(\varphi_s(cb')) = \varphi_s(cb') \sum_{i=0}^{t-1} i \left( \sum_{j=0}^{n/t-1} X^{\frac{n}{t}i+j} \right) = \frac{b}{2t^2} \sum_{i=0}^{t-1} i \left( \sum_{j=0}^{n/t-1} X^{\frac{n}{t}i+j} \right)$$

is obtained.

The plaintext of the ciphertext cc is a plaintext polynomial $$\frac{b}{2t^2} \sum_{i=0}^{t-1} i \left( \sum_{j=0}^{n/t-1} X^{\frac{n}{t}i+j} \right)$$

in which the right half plane of the circle group is divided into t (0, 1, 2, 3, ... ) and coefficients increase by the value of the plaintext of the TLWE ciphertext cb in a stepwise manner. When the TLWE ciphertext cb has 3 as the plaintext, a plaintext polynomial is obtained as a result of Private Key Switching, in which 0, 3, 6, 9, and 12 that are multiples of the plaintext (3) of the ciphertext cb are arranged as coefficients of terms of the respective orders corresponding to the right half plane of the circle group.

(3) As the second Bootstrapping, the encryption processing device 1 (the second Bootstrapping unit) performs BlindRotate using the TLWE ciphertext ca for the TRLWE ciphertext cc and then performs SampleExtract, thereby obtaining the TLWE ciphertext cc'. The private key of the ciphertext cc' is [s'].

The TLWE ciphertext ca' obtained by multiplying the TLWE ciphertext ca by 2n has an/t as its plaintext from {a/(2t)}×2n.

Therefore, the term of the plaintext polynomial of $\varphi_{s'}(cc')$, of which the power is close to an/t+n/($2t^2$), is obtained as a constant term.

That is, $\varphi_{s'}(cc')=ab/(2t^2)$, and the TLWE ciphertext cc' has $ab/(2t^2)$ as the plaintext. The product of the plaintext integer a and the plaintext integer b has been obtained, and the TLWE ciphertext cc' is a ciphertext corresponding to the product of the plaintext integer a and the plaintext integer b.

Specifically, as a result of the second Bootstrapping, integers 0, 3, 6, 9, and 12 that are multiples of 3 based on the plaintext polynomial of the TLWE ciphertext cb' are arranged. Among them, the third value, i.e., 6 is obtained as the TLWE ciphertext cc' in order to obtain the plaintext integer (a+1)th value of the TLWE ciphertext ca where a is the plaintext integer (because a includes 0), when the plaintext polynomial a of the TLWE ciphertext ca is 2. Actually, a value of 2×3=6 is obtained as a solution of a×b, and multiplication is correctly performed.

Thereafter, the processing for calculating the TLWE ciphertext cl of the lower bits of the multiplication result and the TLWE ciphertext cu' of the higher bits is the same as the processing after (4) in the above-described signed multiplication, and therefore the description thereof is omitted. Also, looping the CMux can substitute for Private Key Switching, as in the above-described signed multiplication.

The process flow according to the second example is the same as the flowchart in FIG. 10 except that the preparation process at Steps S101 and S102 is not performed, and the ciphertext cc' is directly calculated at Step S106 without performing the subtraction process at Step S107.

Third Example

The encryption processing device 1 can further calculate a ciphertext having an integer a×b+e as the plaintext in a procedure described later that is substantially the same procedure as multiplication of the TLWE ciphertext ca having the integer a as the plaintext and the TLWE ciphertext cb having the integer b as the plaintext described in the first and second examples, by performing homomorphic addition of a TLWE ciphertext ce having an integer e as the plaintext or a trivial ciphertext having the integer e as the plaintext to the TLWE ciphertext cc' obtained in the process of the multiplication of the TLWE ciphertext ca and the TLWE ciphertext cb.

If the ciphertext corresponding to e is simply added after multiplication between ciphertexts corresponding to a×b, the addition may cause a carry or a borrow. Therefore, it is necessary to perform BlindRotate for the result of comparison between the plaintext a×b and the plaintext e multiple times in order to calculate a ciphertext indicating a carry or a borrow, so that a large amount of computation time is required.

Meanwhile, in the third example, addition of the ciphertext corresponding to the plaintext e is included in the process of the multiplication between the ciphertexts ca and cb. Thus, it is not necessary to perform BlindRotate for a carry or a borrow in addition to the third Gate Bootstrapping and the fourth Gate Bootstrapping, so that an operation of FMA (Fused Multiply-Add) can be significantly speeded up.

The procedure for calculating the integer a×b+e is the same as the procedure of multiplication described in the first and second examples except for homomorphic addition of the TLWE ciphertext ce performed in the middle of the procedure, and the number of times of BlindRotate is also the same.

In the following descriptions, a method for calculating the ciphertext of the integer a×b+e is simply described as a multiplication method. It is also possible to include homomorphic subtraction in place of homomorphic addition and to calculate a ciphertext of an integer a×b−e.

The operation in the form of a×b+e is known as FMA or fused multiply-add. FMA can be used for, for example, calculation of the dot product (dot product distance) of vectors which can be applied to biometric authentication.

As a simple example, when the dot product [a]·[b] of a three-dimensional vector [a]=(ciphertext of element $a_1$, ciphertext of element $a_2$, ciphertext of element $a_3$) and a three-dimensional vector [b]=(ciphertext of element $b_1$, ciphertext of element $b_2$, ciphertext of element $b_3$) in which three elements are each encrypted is obtained, all the results of multiplication between corresponding elements are added. Therefore, the encryption processing device 1 calculates ciphertext of $a_1$·ciphertext of $b_1$+ciphertext of $a_2$·ciphertext of $b_2$+ciphertext of $a_3$·ciphertext of $b_3$.

When the above operation is performed without using FMA, BlindRotate corresponding to three multiplication operations are simply required up to calculation of the result of multiplication of the ciphertext $a_1$ and the ciphertext $b_1$, the result of multiplication of the ciphertext $a_2$ and the ciphertext $b_2$, and the result of multiplication of the ciphertext $a_3$ and the ciphertext $b_3$. Thereafter, in order to sum the multiplication results, it is necessary to perform homomorphic addition of which the number of times is equal to the number of the elements (the order of the vector)−1. Here, if there is no particular restriction on the value of each element, it is necessary to consider a carry or a borrow, and thus additional bootstrapping or BlindRotate is required for the determination.

That is, the number of times of BlindRotate performed in the entire calculation of the dot product is three times the number of times of BlindRotate described in the first example and the second example and twice the number of times of BlindRotate necessary for processing for a carry or a borrow.

Meanwhile, when FMA is used, calculation of ciphertext of $a_1$·ciphertext of $b_1$+ciphertext of $a_2$·ciphertext of $b_2$+ciphertext of $a_3$·ciphertext of $b_3$ can be performed in the following manner.

The encryption processing device 1 associates the TLWE ciphertext cc' obtained in the middle of the result of multiplication of the ciphertext of $a_1$ and the ciphertext $b_1$ with the above-described TLWE ciphertext ce and associates multiplication of the ciphertext of $a_2$ and the ciphertext $b_2$ with the above-described multiplication of the TLWE ciphertext ca and the TLWE ciphertext cb, thereby being able to perform calculation of ciphertext of $a_1$ ciphertext of $b_1$+ciphertext of $a_2$·ciphertext of $b_2$ by performing the first half of the procedure of multiplication (until the TLWE ciphertext cc' is obtained) once and the entire procedure of multiplication once.

Further, by associating the ciphertext that is the result of the operation of ciphertext of $a_1$·ciphertext of $b_1$+ciphertext of $a_2$·ciphertext of $b_2$, obtained above, with the ciphertext ce and associating multiplication of the ciphertext of $a_3$ and the ciphertext $b_3$ with the ciphertext ca and the ciphertext cb, the encryption processing device 1 can perform calculation of ciphertext of $a_1$·ciphertext of $b_1$+ciphertext of $a_2$·ciphertext of $b_2$+ciphertext of $a_3$·ciphertext $b_3$ in one multiplication procedure.

By using FMA, calculation corresponding to the dot product of vectors can be executed by performing an arithmetic process substantially equal to multiplication twice in total and the first half of an arithmetic process of multiplication once, which results in a smaller amount of calculation than in a case where the whole multiplication is performed three times. It can be said that the processing can be performed at much higher speed as compared with a case of not using FMA, because a process for a carry or a borrow is required in addition to the three times of multiplication in the latter case.

When the number of elements of the vector is two or more than three, the same processing can be performed.

If the allowable range of errors permits, the number of TLWE ciphertexts to be added to the TLWE ciphertext cc' may be increased. For example, it is assumed that the TLWE ciphertext cc' obtained in the middle of multiplication of the ciphertext $a_1$ and the ciphertext $b_1$ is ce1. Similarly, it is assumed that the TLWE ciphertext cc' obtained in the middle of multiplication of the ciphertext $a_2$ and the ciphertext $b_2$ is ce2. By associating a ciphertext that is the operation result of homomorphic addition between TLWE ciphertexts, ce1+ce2, with the ciphertext ce and associating multiplication of the ciphertext of $a_3$ and the ciphertext $b_3$ with the ciphertext ca and the ciphertext cb, calculation of ciphertext of $a_1$·ciphertext of $b_1$+ciphertext of $a_2$·ciphertext of $b_2$+ciphertext of $a_3$·ciphertext of $b_3$ can be performed. In this case, the first half of the multiplication operation is performed twice and the entire procedure of the multiplication operation is performed once.

In either case, it is desirable to perform homomorphic addition corresponding to a×b+e in the stage where the denominator of the plaintext is $2t^2$, as will be described later. Further, in a case of calculating the ciphertext of the integer a×b−e, it is desirable to perform homomorphic subtraction in the stage where the denominator of the plaintext is $2t^2$. This is because in the stage where the denominator is $2t^2$, the range of integers that can be stored in one TLWE ciphertext is wide from $-t^2$ to $t^2-1$, and therefore it is not necessary to consider occurrence of a carry or a borrow caused by homomorphic addition or homomorphic subtraction.

Specifically, the encryption processing device 1 implements FMA by the following processing.

In addition to the first example and the second example in FIGS. 2A and 2B and FIGS. 13A and 13B, the encryption processing device 1 adds the ciphertext ce having $e/2t^2$ as its plaintext or a trivial ciphertext $(0, e/2t^2)$ having $e/2t^2$ as its plaintext to the TLWE ciphertext cc' having $ab/(2t^2)$ as its plaintext in a homomorphic manner to obtain a new TLWE ciphertext cc'. The new TLWE ciphertext cc' can have $(ab+e)/2t^2$ as its plaintext.

The encryption processing device 1 performs the processing by the first operation unit 12, the second operation unit 13, and the third Bootstrapping unit 18 for this new ciphertext cc' as in the first example and the second example, thereby calculating the TLWE ciphertext cl that has $(ab+e)/2t^2$ as the plaintext and is the lower bits of the operation result of a×b+e. The TLWE ciphertext cl has $(ab+e \bmod t)/2t$ as its plaintext.

Further, the encryption processing device 1 performs processing by the fourth Bootstrapping unit 19 for the TLWE ciphertext cl to calculate the TLWE ciphertext cl' having $(ab+e \bmod t)/2t^2$ as the plaintext. The encryption processing device 1 inputs the TLWE ciphertext cl' to the third operation unit 14 and performs homomorphic subtraction between the TLWE ciphertext cl' and the new TLWE ciphertext cc' corresponding to ab+e to obtain the TLWE ciphertext cu. The TLWE ciphertext cu has $\{(ab+e)-(ab+e \bmod t)\}/2t^2$ as the plaintext, and the encryption processing device 1 performs Public Key Switching for the TLWE ciphertext cu, thereby obtaining the TLWE ciphertext cu'.

In the signed multiplication using the entire plane of the circle group described in the first example, for example, the fourth operation unit 15 adds the TLWE ciphertext ce or the trivial ciphertext $(0, e/2t^2)$ to the TLWE ciphertext cc' in a homomorphic manner to obtain a new TLWE ciphertext cc' in FIGS. 2A and 2B. The encryption processing device 1 performs processing by the first operation unit 12, the third Bootstrapping unit 18, and the second operation unit 13 for the new TLWE ciphertext cc' calculated by the fourth operation unit 15 and, if necessary, further performs processing by the fourth Bootstrapping unit 19 and the third operation unit 14.

Alternatively, after the fourth operation unit 15 calculates the TLWE ciphertext cc', the first operation unit 12 may add the ciphertext ce or the trivial ciphertext $(0, e/2t^2)$ to the TLWE ciphertext cc' in a homomorphic manner to obtain a new TLWE ciphertext cc', multiply the TLWE ciphertext cc' by t, and perform processing by the third Bootstrapping unit 18 and the second operation unit 13 for the ciphertext cc' multiplied by t.

In the unsigned multiplication that only uses the right half plane of the circle group described in the second example, after the second Bootstrapping unit 17 calculates the TLWE ciphertext cc', for example, the first operation unit 12 adds the TLWE ciphertext ce or the trivial ciphertext $(0, e/2t^2)$ to the TLWE ciphertext cc' in a homomorphic manner to obtain a new TLWE ciphertext cc', the new TLWE ciphertext cc' is multiplied by t, and processing by the third Bootstrapping unit 18 and the second operation unit 13 is performed for the result in FIGS. 13A and 13B. If necessary, processing by the fourth Bootstrapping unit 19 and the third operation unit 14 is further performed.

In either case, it is desirable to perform homomorphic addition or homomorphic subtraction of the ciphertext of the integer e to or from the new TLWE ciphertext cc' before the new TLWE ciphertext cc' is multiplied by t by the first operation unit 12 to have 2t as the denominator of the plaintext. Calculation between plaintexts corresponds to, for example, $ab/2t^2+e/2t^2$. In the stage where the denominator of the plaintext is $2t^2$, the range of integers that can be stored in one TLWE ciphertext is wide from $-t^2$ to $t^2-1$, and therefore it is advantageous that the occurrence of a carry or a borrow caused by homomorphic addition or subtraction needs not to be considered.

Meanwhile, even in a case of performing homomorphic addition in the middle of the multiplication process, when the ciphertext of the integer e is added or subtracted to or from the ciphertext obtained by multiplying the TLWE ciphertext cc' by t by the first operation unit 12 in a homomorphic manner, calculation between plaintexts is performed as $ab/2t+e/2t$. In this case, the range of integers that can be stored in one TLWE ciphertext is narrow from $-t$ to $t-1$ and it is necessary to consider occurrence of a carry or a borrow caused by homomorphic addition or subtraction. Therefore, bootstrapping or BlindRotate is additionally required for the determination.

Fourth Example

The encryption processing device 1 applies the signed multiplication in the first example, the unsigned multiplication in the second example, and FMA in the third example to speed up a multiple precision arithmetic (multiplication) by an algorithm called the Karatsuba algorithm.

In order to obtain the product Z of the multiplicand X and the multiplier Y, when the multiplicand X and the multiplier Y are each divided into two based on the radix k, $X=x_1 \cdot k+x_0$ $Y=y_1 \cdot k+y_0$ and the product Z can be expressed as follows.

$Z=z_2 \cdot k^2+z_1 \cdot k+z_0$

In order to calculate ciphertexts of $z_2$, $z_1$, and $z_0$ configuring the product Z, operations $z_2$=ciphertext of $x_1$×ciphertext of $y_1$ $z_0$=ciphertext of $x_0$×ciphertext of $y_0$ $z_1$=ciphertext of $x_1$×ciphertext of $y_0$+ciphertext of $x_0$×ciphertext of $y_1$ are performed. Therefore, when the Karatsuba algorithm is not used, it is necessary to perform multiplication four times in total.

This is the same calculation method as that for calculating 2-digit integers by ordinary manual calculation.

Generally, in multiplication, calculation becomes more complicated as the number of digits to be treated increases. Therefore, by dividing the multiplier and the multiplicand into two, there is an advantage that the number of digits to be treated in each multiplication can be reduced to half. By recursively repeating this process, the value can be made smaller to the number of digits that can be directly multiplied.

On the other hand, in the Karatsuba algorithm, in particular, the ciphertext of $z_1$ among $z_2$, $z_1$, and $z_0$ is obtained as $-$(ciphertext of $x_1$−ciphertext of $x_0$)×(ciphertext of $y_1$−ciphertext of $y_0$)+ciphertext of $z_2$+ciphertext of $z_0$.

Each of (ciphertext of $x_1$-ciphertext of $x_0$) and (ciphertext of $y_1$-ciphertext of $y_0$) is a result of homomorphic subtraction between ciphertexts. The homomorphic subtraction result may be a negative value depending on values of the plaintexts $x_1$ and $x_0$ and values of the plaintexts $y_1$ and $y_0$. Even when both the homomorphic subtraction results are positive, signed multiplication needs to be performed for −(ciphertext of $x_1$−ciphertext of $x_0$)×(ciphertext of $y_1$−ciphertext of $y_0$).

Therefore, for (ciphertext of $x_1$−ciphertext of $x_0$)×(ciphertext of $y_1$−ciphertext of $y_0$), the signed multiplication using the entire plane of the circle group described in the first example is performed. The ciphertext corresponding to plaintext $x_1$-plaintext $x_0$ corresponds to the ciphertext ca, and the ciphertext corresponding to plaintext $y_1$-plaintext $y_0$ corresponds to the ciphertext cb.

When the ciphertext of $z_2$+ciphertext of $z_0$ is associated with the above TLWE ciphertext ce and (ciphertext $x_1$-ciphertext $x_0$)×(ciphertext $y_1$-ciphertext $y_0$) is associated with multiplication of the TLWE ciphertext ca and the TLWE ciphertext cb described above, ciphertext of $z_2$+ciphertext of $z_0$−(ciphertext $x_1$−ciphertext $x_0$)×(ciphertext $y_1$−ciphertext $y_0$) has the same form as FMA, and the ciphertext of $z_1$ can be calculated by performing a multiplication operation process once as in the third example.

As ciphertext of $z_2$+ciphertext of $z_0$, it is necessary to use the TLWE ciphertext obtained as the TLWE ciphertext cc' before decomposition into higher order and lower order.

Figure 14A:
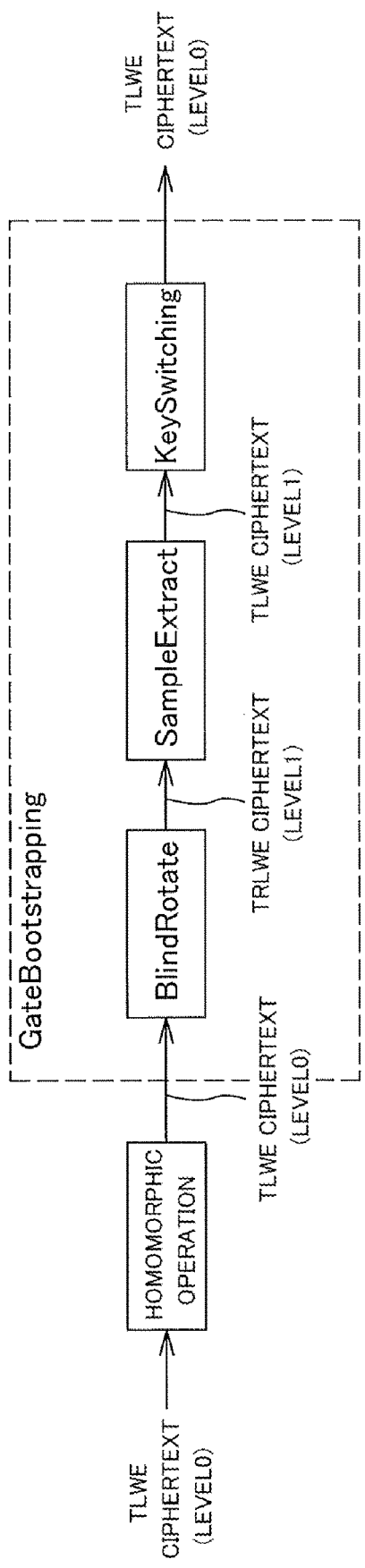
FIGS. 14A and 14B are diagrams illustrating ciphertexts input to and output from Gate Bootstrapping in the present embodiment.
Figure 14B:
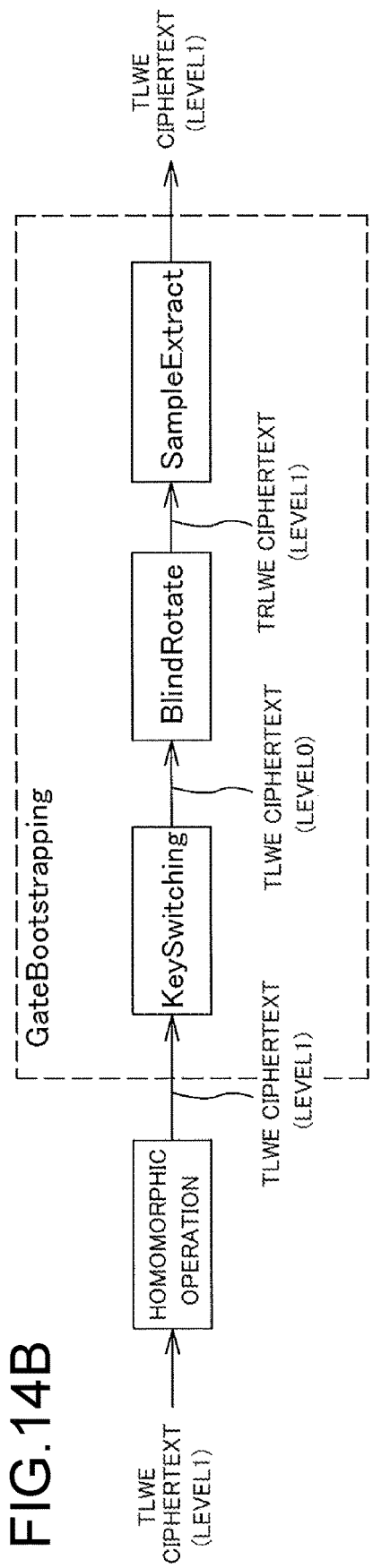

FIGS. 14A and 14B are diagrams illustrating ciphertexts input to and output from Gate Bootstrapping in the present embodiment.

In the above description, Gate Bootstrapping, in particular, the first Bootstrapping has been described as being performed in the order of BlindRotate, SampleExtract, and Public Key Switching, as illustrated in FIG. 14A.

The order is not limited thereto. In Gate Bootstrapping, Public Key Switching can be performed first, and thereafter BlindRotate and SampleExtract can be performed, as illustrated in FIG. 14B.

As for TLWE ciphertexts, there is a concept of levels depending on security strengths.

In Gate Bootstrapping in FIG. 14A, TLWE ciphertexts as input and output are at LEVEL0. A TLWE ciphertext obtained by performing BlindRotate for a LEVEL0 TLWE ciphertext and performing SampleExtract for a TRLWE ciphertext as the output of BlindRotate is at LEVEL1. However, as a result of Public Key Switching, a LEVEL0 TLWE ciphertext is output.

Meanwhile, in the method illustrated in FIG. 14B, TLWE ciphertexts as input and output of the Gate Bootstrapping are set to LEVEL1, and Public Key Switching is performed first to lower the level to LEVEL0. In this state, BlindRotate is performed. When SampleExtract is then performed for the TRLWE ciphertext as the output of BlindRotate, a LEVEL1 TLWE ciphertext is output.

The LEVEL0 ciphertext is formed by an N-th order vector [a] of elements on the circle group $\{T\}$ encrypted with an N-th order private key [s]. Meanwhile, the LEVEL1 ciphertext obtained as a result of SampleExtract is formed by an n-th order vector [a'] of elements on the circle group $\{T\}$ encrypted with an n-th order private key [s'].

In the LEVEL0 ciphertext, the number of coefficients (the order of the vector) contributing to difficulty of the LWE problem is smaller than that in the LEVEL1 ciphertext, and thus the amount of calculation of homomorphic addition is smaller as compared with the LEVEL1 ciphertext.

On the other hand, the LEVEL0 ciphertext has a problem that the security strength tends to decrease when an allowable error added to a plaintext is made small. This is because in LWE encryption, the security is ensured by the error added to the plaintext.

In TLWE encryption, calculation (decipher) is more difficult as the error added to the plaintext is larger and the number of coefficients (the order of the vector) is larger.

In other words, regarding TLWE encryption, the smaller the error added to the plaintext is and the smaller the number of coefficients (the order of the vector) is, the easier calculation (decipher) is.

In particular, in TFHE applied to the Integer-wise type, it is necessary to divide the range from 0 to 1 of the circle group $\{T\}$ more finely as the value of the plaintext (integer) stored in a TLWE ciphertext becomes larger. Thus, an error needs to be made smaller also because of a problem of an error in decryption which will be described later. In this case, the security strength tends to decrease, as described above. Therefore, in order to make the error smaller, it is necessary to ensure security by increasing the number of coefficients (the order of the vector) in the ciphertext.

In order to ensure the security of the ciphertext that is easy to calculate (decipher) by reducing the error added to the plaintext, it is desirable to move Public Key Switching to the beginning of Gate Bootstrapping and to use the LEVEL1 ciphertexts, having a large number of coefficients (the order of the vector) and is easy to make an error range smaller, as input and output of Gate Bootstrapping. Then, after conversion to LEVEL0 is performed at the beginning of Gate Bootstrapping, the level is not returned to LEVEL0 at the end. By not returning the level to the LEVEL0, it is possible to safely perform calculation of the TLWE ciphertext also in the next stage.

The time required for BlindRotate is proportional to the number of coefficients (the order of the vector) of the input TLWE ciphertext, because the number of times of CMux is the same as the order. Therefore, when the LEVEL1 ciphertext is input, the time required for BlindRotate becomes longer in proportion to the number of coefficients (the order of the vector) than when the LEVEL0 ciphertext is input.

Even if a LEVEL1 ciphertext is input to Gate Bootstrapping in order to ensure the security of the ciphertext, it is possible to avoid increase in the required time by performing BlindRotate using the LEVEL0 TLWE ciphertext obtained by conversion by Public Key Switching as input.

Further, making an error to be added to a plaintext smaller has a problem of an error in decryption in addition to the above-described problem of security strength.

As described above, in TFHE applied to Integer-wise type, the range from 0 to 1 associated with the circle group $\{T\}$ is divided into 2t. When the value of t is made larger and the circle group is more finely divided, the integer value that can be recorded in a TLWE ciphertext can be further increased. The maximum value that can be stored is determined by the number t of divisions of the circle group. However, since it is necessary to make the error range smaller in order to store a large value, there are a problem that the security strength decreases and a problem that the decryption error rate increases.

In LWE homomorphic encryption including TFHE, errors added to plaintexts are distributed in the normal distribution, and it is not possible to strictly set an "error range".

In principle, it is only possible to concentrate more errors in a specified range, although there is no change in the concentration around 0.

When the error is out of the set range, the corresponding plaintext is interpreted as another plaintext, and thus an unexpected calculation result may be obtained.

The calculation itself does not become impossible, but only a different result is obtained. How much probability that a different calculation result is obtained is acceptable depends on the application to which homomorphic encryption is applied.

It is necessary to set a system parameter to make the overlap of error ranges fall within certain values in order to best balance three objectives of suppressing the probability of occurrence of an error in calculation, speeding up calculation by reducing the number of times of BlindRotate, and maintaining high security.

The error may be set so as to satisfy a particularly important condition in accordance with a system or a device to which the present embodiment is applied.

Application Example

The processes performed by the encryption processing device 1 can be applied as follows.

For example, there is considered a case in which it is desired to aggregate, from a database in which fields and/or records are encrypted by TLWE encryption, records each having a specific field within a certain range (for example, a case in which it is desired to obtain an average annual income of 30 to 39 years old).

In this case, the encryption processing device 1 is a database sever that manages the encrypted database, receives a query encrypted by TLWE encryption from a terminal device connected thereto via a network or the like, and returns a response to the query which is encrypted by TLWE encryption to the terminal device.

Since an index cannot be created in the encrypted database, it is necessary to perform comparison and aggregation for the entire database.

The encryption processing device 1 performs a comparison operation that compares all the records of the encrypted database with the query by functions of the first operation unit 12, the second operation unit 13, the third operation unit 14, the fourth operation unit 15, the first Bootstrapping unit 16, the second Bootstrapping unit 17, the third Bootstrapping unit 18, the fourth Bootstrapping unit 19, the fifth Bootstrapping unit 21, the sixth Bootstrapping unit 22, and the key exchange unit 30.

The comparison operation is to perform subtraction between a ciphertext of a record and a ciphertext of a query, and the positive and negative of the subtraction result is equivalent to the comparison operation.

The encryption processing device 1 can further perform an aggregate operation for records that match the query in the comparison operation.

In the aggregate operation, the encryption processing device 1 adds the records that match the query in the comparison operation to calculate a total, and further obtains an average value by using division.

As described above, in processing of a query with respect to an encrypted database, it is necessary to perform four arithmetic operations such as addition, subtraction, multiplication, and division, and comparison (comparison is equivalent to positive or negative of a subtraction result) between integers constituting ciphertexts.

In particular, when a weighted average value is obtained, multiplication of a record and a weighting factor or the like is required. In a case of using Bit-wise type ciphertexts, it is considered that a full adder operation is frequently used for this processing. If the bit length of an integer to be handled becomes large, the number of required full adders also increases. The four arithmetic operations are homomorphic four arithmetic operations with respect to encrypted numerical values that are regarded as ciphertexts of respective bits when a permutation using an input ciphertext is expressed in binary.

The encryption processing device 1 of the present embodiment does not perform four arithmetic operations for Bit-wise type ciphertexts on a bit-by-bit basis using a full adder, but performs four arithmetic operations and comparison between Integer-wise type ciphertexts each having an integer as a plaintext. Therefore, a query execution time can be significantly reduced.

The four arithmetic operations and comparison between integers are used not only for aggregation in the database described above, but also in various data processing using ciphertexts frequently.

Other examples include fuzzy authentication and fuzzy search.

Fuzzy authentication is biometric authentication using, for example, biometric authentication data, and it is an absolute condition that biometric authentication data that does not change over a lifetime is encrypted and concealed.

In fuzzy authentication, authentication is performed based on a correspondence between biometric authentication data presented as an authentication request and biometric authentication data registered in a database. It is determined whether both the data match each other with a threshold, instead of determining whether both the data completely match each other.

Fuzzy search is an ambiguous search method in which data close to a query is presented as a search result from a database even if the query and a record do not completely match.

In fuzzy authentication and fuzzy search, the encrypted database and the query are compared with each other, as in the comparison operation and the aggregation operation in the encrypted database described above. At this time, it is necessary to perform the comparison operation using the data encrypted by homomorphic encryption. When a dot product is obtained as the degree of match between presented biometric authentication data and registered biometric authentication data, multiplication needs to be performed.

In addition, the Euclidean distance is often used for comparison in fuzzy authentication or fuzzy search. When the Euclidean distance is calculated, calculation of a square is required. In bit-wise type homomorphic encryption, O ($N^2$) full adders must be caused to operate with respect to the bit length of data when multiplication is performed. Even in a comparison operation by simple subtraction, it is necessary to operate O (N) full adders. The encryption processing device 1 of the present embodiment does not perform four arithmetic operations for Bit-wise type ciphertexts on a bit-by-bit basis using a full adder, but performs four arithmetic operations and comparison between Integer-wise type ciphertexts each having an integer as a plaintext. Thus, the processing time required for fuzzy authentication or fuzzy search can be largely reduced.

Figure 15:
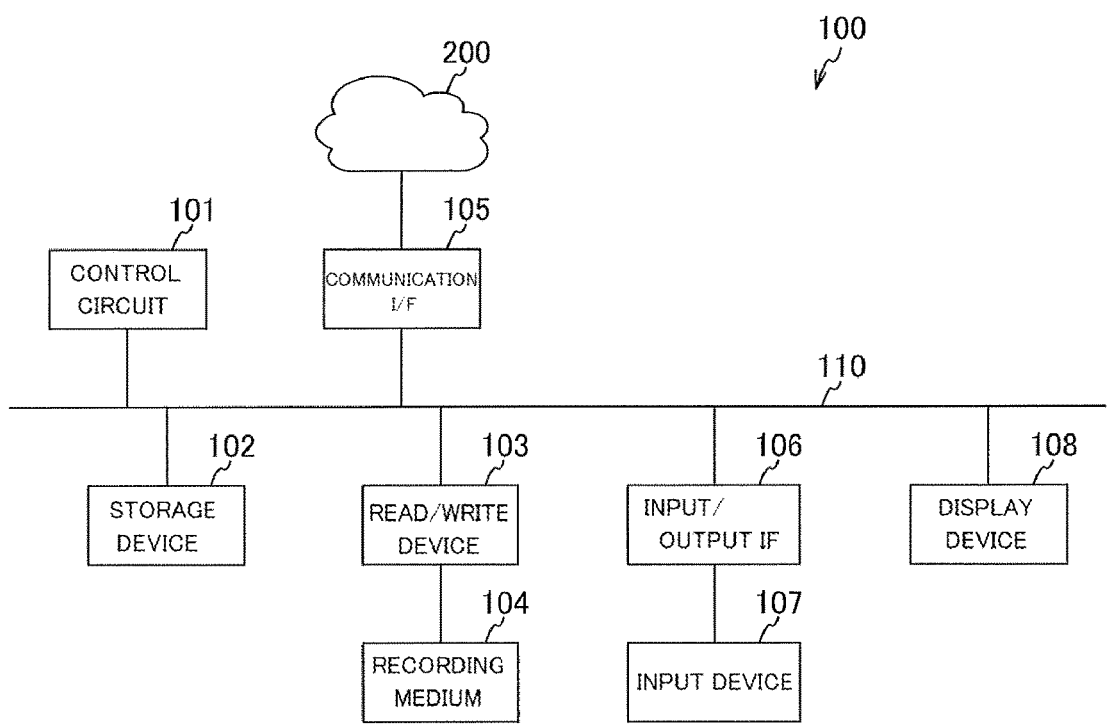
FIG. 15 is a block diagram illustrating an example of a computer device.

FIG. 15 is a block diagram illustrating an example of a computer device.

A configuration of a computer device 100 is described with reference to FIG. 15.

The computer device 100 is, for example, an encryption processing device that processes various types of information. The computer device 100 includes a control circuit 101, a storage device 102, a read/write device 103, a recording medium 104, a communication interface 105, an input/output interface 106, an input device 107, and a display device 108. The communication interface 105 is connected to a network 200. The respective constituent elements are mutually connected to one another via a bus 110.

The encryption processing device 1 can be configured by selecting a part of or all elements from the constituent elements incorporated in the computer device 100 as appropriate.

The control circuit 101 controls the entire computer device 100. For example, the control circuit 101 is a processor such as a Central Processing Unit (CPU), a Field Programmable Gate Array (FPGA), an Application Specific Integrated Circuit (ASIC), and a Programmable Logic Device (PLD). The control circuit 101 functions as the controller 10 in FIG. 1, for example.

The storage device 102 stores various types of data therein. For example, the storage device 102 is a memory such as a Read Only Memory (ROM) and a Random Access Memory (RAM), a non-transitory computer-readable recording medium such as a Hard Disk (HD) and a Solid State Drive (SSD). The storage device 102 may store therein an information processing program that causes the control circuit 101 to function as the controller 10 in FIG. 1. The storage device 102 functions as the storage unit 20 in FIG. 1, for example.

The encryption processing device 1 loads a program stored in the storage device 102 into a RAM when performing information processing.

The encryption processing device 1 executes the program loaded to the RAM by the control circuit 101, thereby performing processing that includes at least one of a receiving process, a first operation process, a second operation process, a third operation process, a fourth operation process, a first Bootstrapping process, a second Bootstrapping process, a third Bootstrapping process, a fourth Bootstrapping process, a fifth Bootstrapping process, a sixth Bootstrapping process, a key exchange process, and an output process.

The program may be stored in a storage device included in a server on the network 200, as long as the control circuit 101 can access that program via the communication interface 105.

The read/write device 103 is controlled by the control circuit 101, and reads data in the removable recording medium 104 and writes data to the removable recording medium 104.

The recording medium 104 stores various types of data therein. The recording medium 104 stores information processing program therein, for example. For example, the recording medium 104 is a non-transitory computer-readable recording medium such as a Secure Digital (SD) memory card, a Floppy Disk (FD), a Compact Disc (CD), a Digital Versatile Disk (DVD), a Blu-ray (registered trademark) Disk (BD), and a flash memory.

The communication interface 105 connects the computer device 100 and another device to each other via the network 200 in a communicable manner. The communication interface 105 functions as the communication unit 25 in FIG. 1, for example.

The input/output interface 106 is, for example, an interface that can be connected to various types of input devices in a removable manner. Examples of the input device 107 connected to the input/output interface 106 include a keyboard and a mouse. The input/output interface 106 connects each of the various types of input devices connected thereto and the computer device 100 to each other in a communicable manner. The input/output interface 106 outputs a signal input from each of the various types of input devices connected thereto to the control circuit 101 via the bus 110. The input/output interface 106 also outputs a signal output from the control circuit 101 to an input/output device via the bus 110. The input/output interface 106 functions as the input unit 26 in FIG. 1, for example.

The display device 108 displays various types of information. The display device 108 is, for example, a CRT (Cathode Ray Tube), an LCD (Liquid Crystal Display), a PDP (Plasma Display Panel), and an OELD (Organic Electroluminescence Display). The network 200 is, for example, a LAN, wireless communication, a P2P network, or the Internet and communicably connects the computer device 100 to other devices.

The present embodiment is not limited to the embodiment described above and various configurations or embodiments can be applied within a scope not departing from the gist of the present embodiment.

All examples and condition statements aided herein are intended for educational purposes to help the reader understand the concepts contributed by the inventor to further the invention and the art, and are to be construed as not limited to such specifically aided examples and conditions, and the construction of such examples is not relevant to depicting the superiority of the invention. While embodiments of the invention have been described in detail, it is to be understood that various changes, substitutions, and modifications may be made herein without departing from the spirit and scope of the invention.

What is claimed is:

1. An encryption processing device that processes a ciphertext, the ciphertext being a fully homomorphic ciphertext that has a value obtained by adding an error with a predetermined variance to a predetermined value, as a plaintext associated with an integer and that enables a predetermined operation between integers to be performed without decryption, the device comprising a processor which executes a process including:
   generating, based on a first ciphertext as a multiplier, a third ciphertext having a first stepped polynomial as a plaintext; and
   performing an operation based on the third ciphertext and a second ciphertext as a multiplicand to calculate a ciphertext corresponding to a result of multiplication between plaintexts of the first ciphertext and the second ciphertext as a fourth ciphertext of an operation result.

2. The encryption processing device according to claim 1, wherein the process executed by the processor further includes
   performing, in the operation based on the third ciphertext and the second ciphertext, an operation further using a fifth ciphertext for being added to the result of multiplication of the first ciphertext and the second ciphertext, to calculate a ciphertext corresponding to a result of fused-multiply add between the plaintexts of the first ciphertext and the second ciphertext and a plaintext of the fifth ciphertext as the fourth ciphertext of an operation result.

3. The encryption processing device according to claim 2, wherein the process executed by the processor further includes
performing homomorphic addition of the fifth ciphertext to a ciphertext calculated by using the third ciphertext for the second ciphertext as the multiplicand, to calculate the fourth ciphertext.

4. The encryption processing device according to claim 1, wherein an offset of ½ is added to coefficients of the first stepped polynomial.

5. The encryption processing device according to claim 4, wherein the process executed by the processor further includes
calculating a new first ciphertext in which an arrangement order of negative plaintexts is reversed from that in the first ciphertext by using a second stepped polynomial in which the offset of ½ is added to coefficients to the first ciphertext, and
calculating the third ciphertext having the first stepped polynomial as a plaintext based on the new first ciphertext.

6. The encryption processing device according to claim 1, wherein the process executed by the processor further includes
calculating a sixth ciphertext based on a result of a homomorphic operation of a new ciphertext, calculated by using a predetermined polynomial for the fourth ciphertext multiplied by a predetermined number, and the fourth ciphertext.

7. The encryption processing device according to claim 3, wherein the process executed by the processor further includes
calculating a sixth ciphertext based on a result of a homomorphic operation of a new ciphertext, calculated by using a predetermined polynomial for a ciphertext obtained by multiplying, by a predetermined number, the fourth ciphertext calculated by adding the fifth ciphertext to the multiplication result, and the fourth ciphertext.

8. The encryption processing device according to claim 6, wherein the sixth ciphertext is a remainder of division of a multiplication result by the predetermined number, and is lower bits of the multiplication result when the predetermined number is a power of 2.

9. The encryption processing device according to claim 6, wherein the process executed by the processor further includes
calculating a seventh ciphertext based on a result of a homomorphic operation of a new ciphertext calculated by using a predetermined polynomial for the sixth ciphertext, from the fourth ciphertext.

10. The encryption processing device according to claim 9, wherein the seventh ciphertext is a quotient of division of the multiplication result by the predetermined number, and is higher bits of the multiplication result when the predetermined number is a power of 2.

11. The encryption processing device according to claim 1, wherein the process executed by the processor further includes
reducing the number of coefficients in a ciphertext prior to calculation of a new ciphertext by using a predetermined polynomial for a ciphertext as an input, and
calculating the new ciphertext by using the predetermined polynomial for the ciphertext.

12. The encryption processing device according to claim 1, wherein the process executed by the processor further includes
performing the predetermined operation to perform a process related to fuzzy authentication or fuzzy search which uses the ciphertext that is input.

13. The encryption processing device according to claim 1, wherein the process executed by the processor further includes
performing the predetermined operation to process a query for an encryption database based on the ciphertext that is input.

14. The encryption processing device according to claim 1, wherein the process executed by the processor further includes
performing the predetermined operation to perform an operation of a Karatsuba algorithm based on the ciphertext that is input.

15. An encryption processing method of processing a ciphertext executed by a processor, the ciphertext being a fully homomorphic ciphertext that has a value obtained by adding an error with a predetermined variance to a predetermined value, as a plaintext associated with an integer and that enables a predetermined operation between integers to be performed without decryption, the method comprising:
generating, based on a first ciphertext as a multiplier, a third ciphertext having a first stepped polynomial as a plaintext; and
performing an operation based on the third ciphertext and a second ciphertext as a multiplicand to calculate a ciphertext corresponding to a result of multiplication between plaintexts of the first ciphertext and the second ciphertext, as a fourth ciphertext of an operation result.

16. A non-transitory computer-readable recording medium storing therein a program for causing a processor to execute an encryption process of processing a ciphertext, the ciphertext being a fully homomorphic ciphertext that has a value obtained by adding an error with a predetermined variance to a predetermined value, as a plaintext associated with an integer and that enables a predetermined operation between integers to be performed without decryption, the encryption process including:
generating, based on a first ciphertext as a multiplier, a third ciphertext having a first stepped polynomial as a plaintext; and
performing an operation based on the third ciphertext and a second ciphertext as a multiplicand to calculate a ciphertext corresponding to a result of multiplication between plaintexts of the first ciphertext and the second ciphertext, as a fourth ciphertext of an operation result.

17. An encryption processing device that processes a ciphertext, the ciphertext being a fully homomorphic ciphertext that has a value obtained by adding an error with a predetermined variance to a predetermined value, as a plaintext associated with an integer and that enables a predetermined operation between integers to be performed without decryption, the device comprising a processor which executes a process including:
calculating a eighth ciphertext having a polynomial as a plaintext by using a predetermined polynomial for a first ciphertext as a multiplier; and
multiplying each element of the eighth ciphertext by a corresponding element of a ciphertext based on a second ciphertext as a multiplicand to calculate a fourth ciphertext corresponding to a result of multiplication between plaintexts of the first ciphertext and the second ciphertext.

* * * * *